(12) United States Patent
Shimada et al.

(10) Patent No.: US 6,293,643 B1
(45) Date of Patent: Sep. 25, 2001

(54) PRINTING APPARATUS, PRINTING METHOD, AND RECORDING MEDIUM

(75) Inventors: Kazumichi Shimada; Shixin Zhou; Yukimitsu Fujimori; Sa Liu, all of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/189,399

(22) Filed: Nov. 10, 1998

(30) Foreign Application Priority Data

Nov. 19, 1997 (JP) .................................................... 9-336530

(51) Int. Cl.[7] ................................ B41J 2/205; B41J 2/145
(52) U.S. Cl. .................................. 347/15; 347/40; 347/41
(58) Field of Search .................................. 347/15, 40, 41

(56) References Cited

U.S. PATENT DOCUMENTS

| | | | | |
|---|---|---|---|---|
| 5,795,082 | * | 8/1998 | Shimada et al. | 347/15 |
| 5,984,449 | * | 11/1999 | Tajika et al. | 347/15 |
| 6,024,438 | * | 2/2000 | Koike et al. | 347/15 |
| 6,027,199 | * | 2/2000 | Reed | 347/15 |

FOREIGN PATENT DOCUMENTS

| | | |
|---|---|---|
| 59-201864 | 11/1984 | (JP) . |
| 7-040548 | 2/1995 | (JP) . |

* cited by examiner

Primary Examiner—John Barlow
Assistant Examiner—An H. Do
(74) Attorney, Agent, or Firm—Oblon, Spivak, McClelland, Maier & Neustadt, P.C.

(57) ABSTRACT

The printing apparatus of the present invention adopts the technique of effectively utilizing two or more different types of dots having different ink densities and different ink weights. The printing apparatus has a head that provides inks of different densities with respect to at least one color and creates dots of different diameters. The density per unit area is varied by changing the combination of the ink density and the dot diameter. In the half tone area, the lightness of smaller dark dots is made substantially coincident with the lightness of larger light dots. Both the smaller dark dots and the larger light dots are created in the half tone, so as to prevent the banding from occurring in a resulting printed image. The smaller dark dots and the larger light dots may be arranged according to a predetermined pattern or at random. The pattern should be set by taking into account the ink duty of the recording paper.

9 Claims, 20 Drawing Sheets

Fig. 10

| | | C1 | C2 | M1 | M2 | Y | Bk |
|---|---|---|---|---|---|---|---|
| Dyes | Directblue199 | 3.6 | 0.9 | | | | |
| | Acidred289 | | | 2.8 | 0.7 | | |
| | Directyellow86 | | | | | 1.8 | |
| | Foodblack2 | | | | | | 4.8 |
| Diethylene glycol | | 30.0 | 35.0 | 20.0 | 25.0 | 30.0 | 25.0 |
| Surfinol 465 | | 1.0 | 1.0 | 1.0 | 1.0 | 1.0 | 1.0 |
| Water | | 65.4 | 63.1 | 76.2 | 73.3 | 67.2 | 69.2 |
| Viscosity(mPa·s) | | 3.0 | 3.0 | 3.0 | 3.0 | 3.0 | 3.0 |
| Lightness (dye weight / ink weight) | Smaller dots (ink weight 5 ng) | 18.0 | 4.5 | 14.0 | 3.5 | 9.0 | 24.0 |
| | Larger dots (ink weight 20 ng) | 72.0 | 18.0 | 56.0 | 14.0 | 36.0 | 96.0 |

PRINTING APPARATUS, PRINTING METHOD, AND RECORDING MEDIUM

BACKGROUND OF THE INVENTION

1. Field of the Invention

The present invention relates to a printing apparatus that has a head, which enables at least two types of dots having different ink densities and ink weights to be recorded, and prints a multi-tone image with inks spouted from the head. The present invention also pertains to a printing method and a recording medium for realizing the above functions.

2. Description of the Related Art

Color ink jet printers that spout inks of plural colors from the respective ink spout heads are widely used as the output apparatus of the computer. The color ink jet printer prints multi-color multi-tone images processed by the computer. One proposed technique applicable for such a printing apparatus and the corresponding printing method utilizes a higher-density ink and a lower-density ink, with a view to further improving the printing quality in a highlighted area or in an area of low image density. This technique provides a higher-density ink and a lower-density ink for an identical color and controls the spout of these inks, so as to realize printing of excellent tone expression. Another proposed printing apparatus creates dots of different ink weights by the respective inks.

Another proposed technique for expressing the multi-tone creates two different types of dots having different ink densities and different ink weights, so as to vary the density per unit area in multiple stages (for example, JAPANESE PATENT LAID-OPEN GAZETTE No. 59-201864). This technique causes each pixel to consist of four dots and varies the frequency of appearance of the higher-density dots and the lower-density dots in the pixel, in order to print an image of multiple densities.

In a printer that creates dots to record an image, the mechanical manufacturing error of the head that spouts ink and creates dots may cause banding, that is, unevenness of formation of dots, in the head-reciprocating direction or in the main scanning direction. The banding at any tone level deteriorates the picture quality. The effect is especially pronounced in the half tone area that has a relatively small number of dots. In the printer that records an image with dots, it is important to prevent such a banding for the improvement in picture quality. A variety of techniques have been proposed to cancel the banding, separately from realizing the multi-toning, which also leads to an improvement in picture quality. One example is the overlap method that forms each raster by a plurality of main scans of the head.

In the printing apparatus that can create two different types of dots having different ink densities and ink weights, however, no special attention is given to cancel the banding and improve the picture quality. This conventional printing apparatus creates the two different types of dots corresponding to the input tones of the respective pixels according to a predetermined pattern. It is not determined which one of the two types of dots is to be created for each dot unit, based on a variety of conditions for recording an image with dots.

The conventional printing apparatus makes the density per unit area for the dots of a larger ink weight generated by the light ink lower than that for the dots of a smaller ink weight generated by the dark ink, in order to realize multi-toning and improve the picture quality. The density of each pixel is expressed by a combination of these different types of dots. In this arrangement, the dots to be used depend upon only the tone values of the image data, and there is a relatively restricted degree of freedom for the section of the dots. This may cause an inadequate printing result. In general, dots of a smaller ink weight are liable to cause banding. The banding often arises at the tone level where a large number of small dots are created. The larger number of small dots may also result in exceeding the allowable quantity of ink per unit area of the paper, that is, the ink duty of the paper.

SUMMARY OF THE INVENTION

The object of the present invention is thus to provide a technique of effectively utilizing at least two different types of dots having different ink densities and different ink weights, for various purposes including prevention of banding, in a printing apparatus.

At least part of the above and the other related objects is realized by a printing apparatus that records plural types of dots on a printing medium, based on input image data, and thereby prints an image. The printing apparatus includes: a head that creates plural types of dots with respect to at least one hue by combinations of different ink densities and different ink weights, the dots including at least two types of identical-density dots having a substantially identical unit density or density per unit area and at least one type of different-density dot having a different unit density from the identical-density dots; a dot specification unit that determines creation or non-creation of a dot with respect to each pixel and which type of a dot among plural types of dots having different unit densities is to be created, according to the input image data for the pixel; a dot type selection unit that selects one of the at least two types of identical-density dots based on a predetermined selecting condition, with respect to the pixel where one of the identical-density dots is to be created; and a head driving control unit that drives the head and creates the dots determined by the dot specification unit and the dots selected by the dot type selection unit, so as to print a resulting image.

The present invention is also directed to a method of recording plural types of dots on a printing medium with a head, based on input image data, and thereby printing an image. The head that creates plural types of dots with respect to at least one hue by combinations of different ink densities and different ink weights, the dots including at least two types of identical-density dots having a substantially identical unit density or density per unit area and at least one type of different-density dot having a different unit density from the identical-density dots. The method includes the steps of: (a) determining creation or non-creation of a dot with respect to each pixel and which type of a dot among plural types of dots having different unit densities is to be created, according to the input image data for the pixel; (b) selecting one of the at least two types of identical-density dots based on a predetermined selecting condition, with respect to the pixel where one of the identical-density dots is to be created; and (c) driving the head and creating the dots determined in the step (a) and the dots selected in the step (b), so as to print a resulting image.

The printing apparatus of the present invention and the corresponding method create at least three different types of dots having different ink densities and ink weights. There are at least two types of identical-density dots having a substantially identical density per unit area, among the variety of available dots. The structure of the present invention determines creation or non-creation of a dot with respect to each pixel and which type of a dot among these plural types of dots having different unit densities is to be created, according to the tone value of input image data for the pixel. The structure also selects one of the at least two types of identical-density dots based on a predetermined selecting condition, with respect to the pixel where one of the identical-density dots is to be created. The allocation of these at least two types of identical-density dots enhances the degree of freedom for the selection of the dots. This arrangement accordingly improves the picture quality and the convenience of the user according to the selecting condition of the identical-density dots.

In the printing apparatus of the present invention, the predetermined selecting condition used in the dot type selection unit may be related to improvement in picture quality of the resulting printed image.

This arrangement effectively improves the picture quality of the resulting printed image by allocating the at least two types of identical density dots. The improvement in picture quality here implies, for example, to cancel the banding and to realize multi-toning.

It is desirable that the condition related to the improvement in picture quality includes a predetermined ratio of the at least two types of identical-density dots that cancels unevenness of dots created at a specific tone corresponding to the identical-density dots.

This printing apparatus can effectively cancel the unevenness of dot formation due to the mechanical manufacturing error of the print head or another reason, and thereby improve the picture quality of the resulting printed image. The unevenness of dot formation is generally conspicuous for the dots of a smaller ink weight and the dots generated by a higher-density ink. The printing apparatus of the above structure restricts the ratio of these dots to the degree that makes the unevenness of dot formation sufficiently inconspicuous, thus improving the picture quality.

It is not necessary to set the predetermined ratio of the identical-density dots substantially equal to a 1:1 ratio, but any ratio may be adopted as long as the unevenness of dot formation is cancelled and made sufficiently inconspicuous to the visual sensitivity of the human's eyes. In some cases, only one type of the identical-density dots may be created. The predetermined ratio may depend upon only the condition that cancels the unevenness of dot formation or alternatively depend upon a variety of conditions.

The condition related to the improvement in picture quality may further include a predetermined arrangement of the at least two types of identical-density dots based on the predetermined ratio or a condition for selecting each of the at least two types of identical-density dots at random based on the predetermined ratio.

In the case where there are two types of identical-density dots having a substantially identical density per unit area, the predetermined arrangement may be a checker wise arrangement.

In accordance with one preferable application of the printing apparatus, the dot type selection unit carries out the selection according to a recording ratio, which is based on an allowable quantity of ink per unit area of the printing medium.

In the technique that creates dots by the spout of ink and prints an image, there is a limit in the allowable quantity of ink per unit area of the printing medium, that is, the ink duty. Creation of the dots exceeding the limit damages the printing medium and causes an ink blot to deteriorate the picture quality. The printing apparatus of the above preferable structure takes into account the ink duty and sets the recording ratio of the identical-density dots. This arrangement enables adequate allocation of the identical-density dots and realizes the preferable picture quality according to the recording medium. The recording ratio of the identical-density dots may be varied according to the printing medium.

In accordance with another preferable application of the present invention, the printing apparatus further includes an ink cartridge assembly, in which inks having different densities are reserved, and the predetermined selecting condition is related to quantities of consumption of the inks having different densities.

In the printing apparatus with an ink cartridge assembly that stores inks of different densities for an identical color, from the viewpoint of the cost, it is desirable to equally consume these plural inks. In the printing apparatus of this preferable structure, the dots can be selected according to the condition related to the quantities of consumption of the inks having different densities. For example, when the consumption of the lower-density, light ink is greater than the consumption of the higher-density, dark ink, the higher-density ink is used to create the dots of a smaller ink weight, in place of the dots generated by the lower-density ink. This arrangement enables the lower-density ink and the higher-density ink to be consumed substantially equally and thereby reduces the service cost of the printing apparatus.

Another application of the present invention is a recording medium on which a program for realizing the respective functions of the printing apparatus or the respective steps of the method discussed above is recorded. The present invention is accordingly directed to a recording medium, on which a program for specifying print data is recorded in a computer readable manner. The print data here is used to cause a printing apparatus to record plural types of dots on a printing medium, based on input image data, and thereby print an image. The program includes: a first program code that realizes a function of determining creation or non-creation of a dot with respect to each pixel and which type of a dot among plural types of dots is to be created, according to the input image data for the pixel; a second program code that realizes a function of selecting one among plural types of identical-density dots based on a predetermined selecting condition, at a specific tone level where the plural types of identical-density dots having a substantially identical density per unit area are present; and a third program code that realizes a function of outputting a result determined by the determining function and selected by the selecting function.

The computer executes the program recorded on such a recording medium, so as to realize the printing apparatus and the printing method of the present invention discussed above.

Available examples of the recording media include flexible disks, CD-ROMs, magneto-optic discs, IC cards, ROM cartridges, punched cards, prints on which bar codes and other codes are printed, internal storage devices (memories like RAM and ROM) and external storage devices of the computer, and a variety of other computer readable media. The present invention may be constructed as a program supply apparatus that supplies the computer program, which causes the computer to realize the respective steps or functions of the present invention discussed above, via a communication path.

These and other objects, features, aspects, and advantages of the present invention will become more apparent from the following detailed description of the preferred embodiments with the accompanying drawings.

BRIEF DESCRIPTION OF THE DRAWINGS

FIG. 10 is a table showing the ink compositions and properties;

DESCRIPTION OF THE PREFERRED EMBODIMENT

A. Structure of Apparatus

Figure 1:
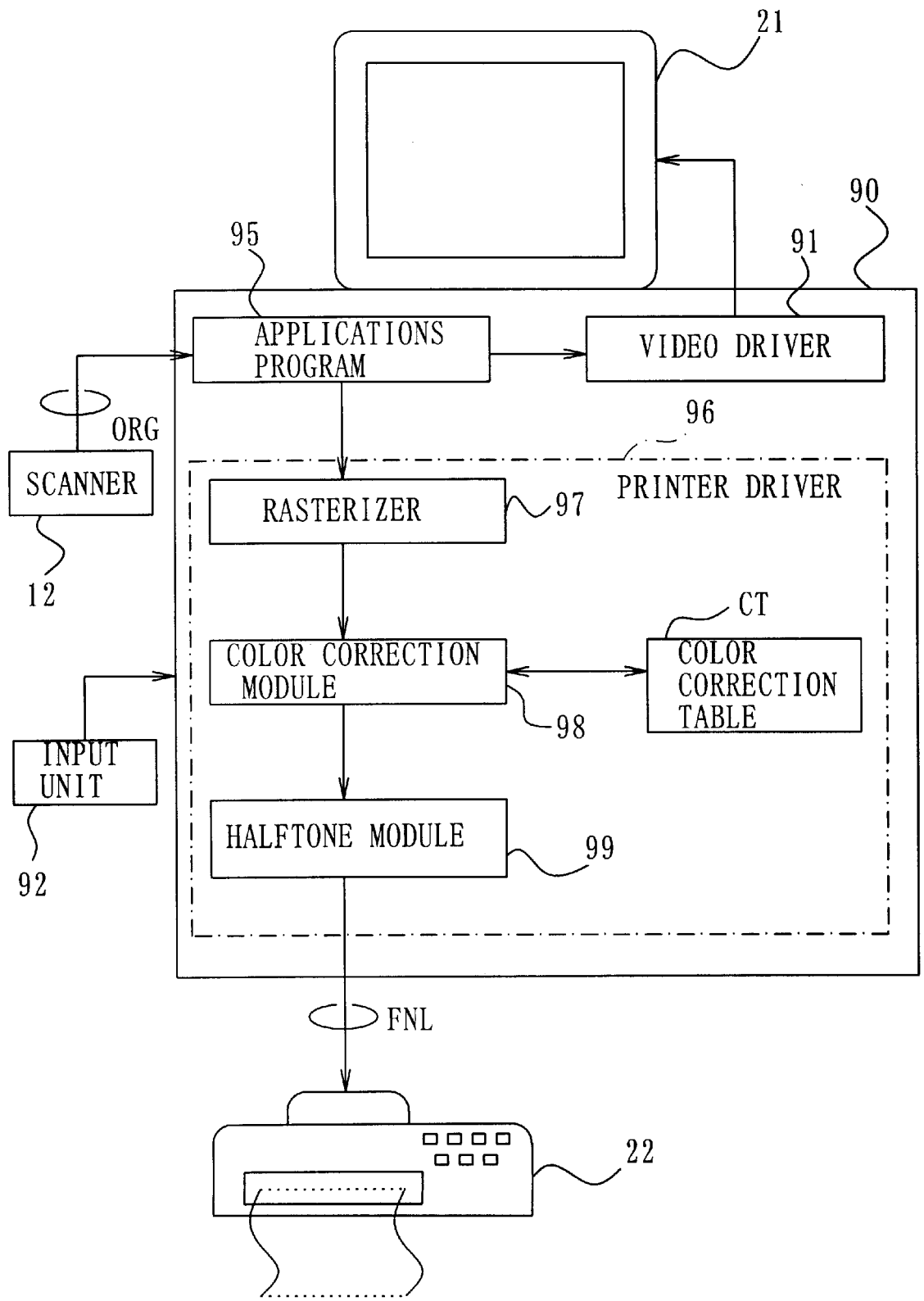
FIG. 1 is a block diagram illustrating the structure of an image processing system including a printer 22 embodying the present invention.

In order to clarity the functions of a printer 22, the outline of a color image processing system including the printer 22 embodying the present invention is discussed with the block diagram of FIG. 1. The color image processing system includes a scanner 12, a personal computer 90, and the color printer 22. The personal computer 90 is provided with a color display 21 and an input unit 92 including a keyboard and a mouse. The scanner 12 reads original color image data ORG from a color original and supplies the original color image data ORG, which consists of three color components, red (R), green (G), and blue (B), to the computer 90.

The computer 90 includes a CPU, a RAM, and a ROM, which are not specifically illustrated herein. An applications program 95 runs under a predetermined operating system. A video driver 91 and a printer driver 96 are incorporated in the operating system, and final color image data FNL are output from the applications program 95 via these drivers 91 and 96. The applications program 95 reads an image with the scanner 12, causes the input image to be subjected to a predetermined processing operation, for example, retouch of the image, and displays a processed image on the CRT display 21 via the video driver 91. When the applications program 95 outputs a printing instruction, the printer driver 96 in the computer 90 receives image information from the applications program 95 and converts the input image information to signals printable by the printer 22 (binarized signals for the respective colors, cyan, magenta, yellow, and black). In the example of FIG. 1, the printer driver 96 includes a rasterizer 97 that converts the color image data processed by the applications program 95 into dot-based image data, a color correction module 98 that causes the dot-based image data to be subjected to color correction according to the ink colors used by the printer 22 and the colorimetric characteristics of the printer 22, and a color correction table CT referred to by the color correction module 98. The printer driver 96 is further provided with a halftone module 99 that generates halftone image data, which express the density in a specific area by the existence or non-existence of ink in each dot unit, from the color-corrected image data. The printer 22 receives the printable signals and records image information on a recording sheet.

Figure 2:
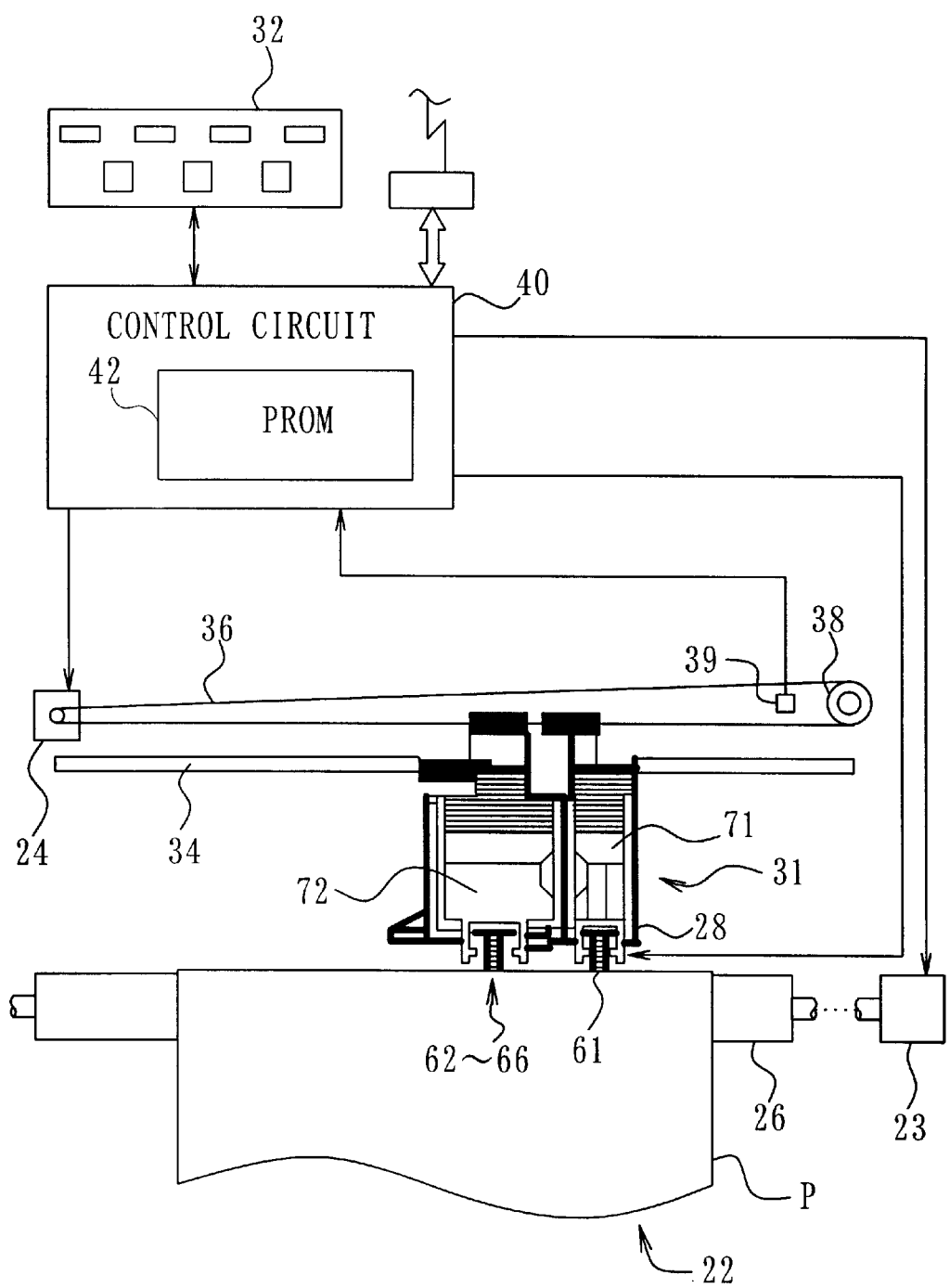
FIG. 2 schematically illustrates the structure of the printer 22.

FIG. 2 schematically illustrates structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and creation of dots, and a control circuit 40 for transmitting signals to and from the sheet feed motor 23, the carriage motor 24, the print head 28, and a control panel 32.

A black ink cartridge 71 for black ink (Bk) and a color ink cartridge 72 in which five color inks, that is, cyan (C1), light cyan (C2), magenta (M1), light magenta (M2), and yellow (Y), are accommodated may be mounted on the carriage 31 of the printer 22. Both the higher-density ink (dark ink) and the lower-density ink (light ink) are provided for the two colors, cyan and magenta. The densities and the weight of these inks will be discussed later. A total of six ink spout heads 61 through 66 are formed on the print head 28 that is disposed in the lower portion of the carriage 31, and ink supply conduits 67 (see FIG. 3) are formed in the bottom portion of the carriage 31 for leading supplies of inks from ink tanks to the respective ink spout heads 61 through 66. When the black ink cartridge 71 and the color ink cartridge 72 are attached downward to the carriage 31, the ink supply conduits 67 are inserted into connection apertures (not shown) formed in the respective cartridges. This enables supplies of inks to be fed from the respective ink cartridges to the ink spout heads 61 through 66.

Figure 3:
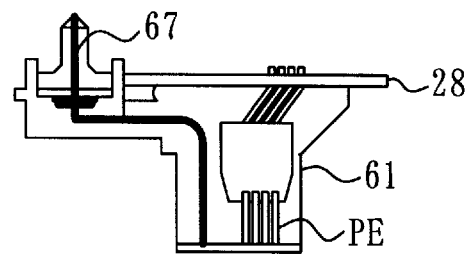
FIG. 3 schematically illustrates the structure of a print head 28 in the printer 22.
Figure 3:
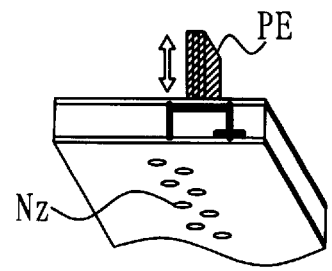

The following briefly describes the mechanism of spouting ink. FIG. 3 schematically illustrates the internal structure of the print head 28. When the ink cartridges 71 and 72 are attached to the carriage 31, supplies of inks in the ink cartridges 71 and 72 are sucked out by capillarity through the ink supply conduits 67 and are led to the ink spout heads 61 through 66 formed in the print head 28 arranged in the lower portion of the carriage 31 as shown in FIG. 3. In the case where the ink cartridges 71 and 72 are attached to the carriage 31 for the first time, a pump works to suck first supplies of inks into the respective ink spout heads 61 through 66. In this embodiment, structures of the pump for suction and a cap for covering the print head 28 during the suction are not illustrated nor described specifically.

Figure 4:
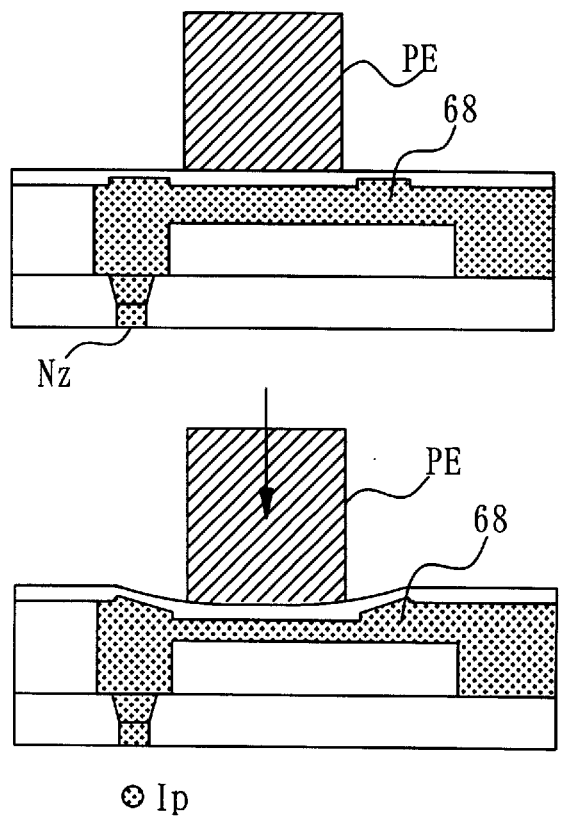
FIG. 4 shows the principle of dot generation in the printer 22.

An array of thirty-two nozzles Nz (see FIG. 5) is formed in each of the ink spout heads 61 through 66 as discussed later. A piezoelectric element PE, which is one of electrically distorting elements and has an excellent response, is arranged for each nozzle Nz. FIG. 4 illustrates a configuration of the piezoelectric element PE and the nozzle Nz. As shown in the upper drawing of FIG. 4, the piezoelectric element PE is disposed at a position that comes into contact with an ink conduit 68 for leading ink to the nozzle Nz. As is known, the piezoelectric element PE has a crystal structure that is subjected to mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 68 as shown in the lower drawing of FIG. 4. The volume of the ink conduit 68 is reduced with an extension of the piezoelectric element PE, and a certain amount of ink corresponding to the reduced volume is sprayed as an ink particle Ip from the end of the nozzle Nz at a high speed. The ink particles Ip soak into the sheet of paper P set on the platen 26, so as to implement printing.

The mechanism for feeding the sheet of paper P has a gear train (not shown) that transmits rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 that detects the position of the origin of the carriage 31.

Figure 5:
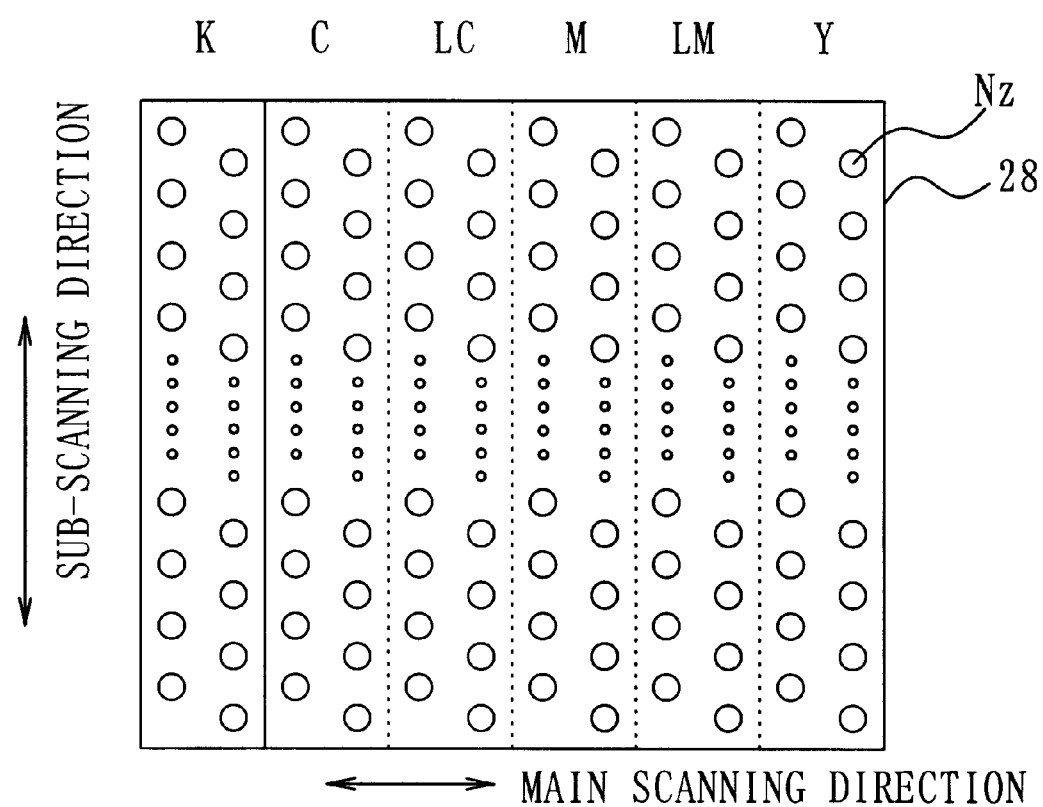
FIG. 5 shows an arrangement of nozzles on the print head 28 in the printer 22.

FIG. 5 shows an arrangement of the ink jet nozzles Nz in the ink spout heads 61 through 66. The printer 22 of this embodiment can form two different types of dots having different ink weights with respect to each color. As shown in FIG. 5, the structure of this embodiment forms the dots of different ink weights with the nozzles of an identical diameter according to a control procedure discussed later. The arrangement includes six nozzle arrays, wherein each nozzle array spouts ink of each color and includes thirty-two nozzles Nz arranged in zigzag at a fixed nozzle pitch k. The positions of the nozzles in the sub-scanning direction are identical in the respective nozzle arrays. The thirty-two nozzles Nz included in each nozzle array may be arranged in alignment instead of in zigzag. The zigzag arrangement shown in FIG. 5, however, allows a small value to be set to the nozzle pitch k in the manufacturing process.

Figure 6:
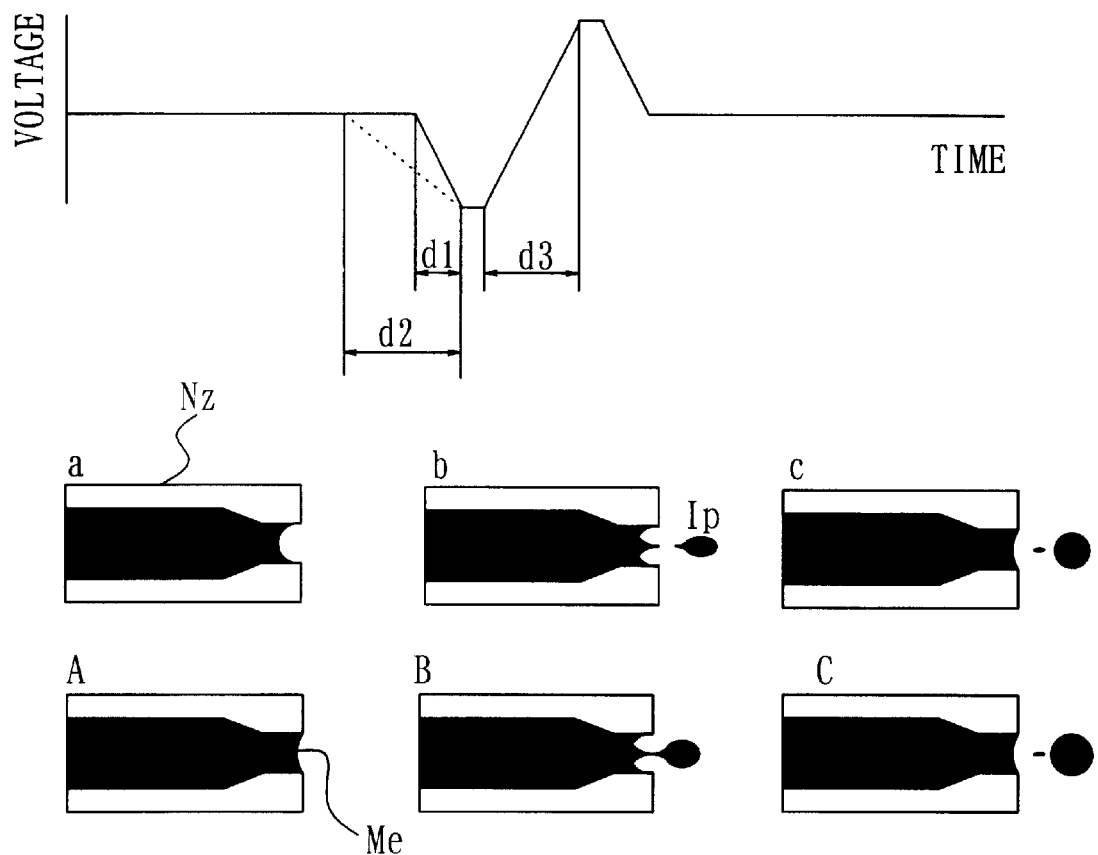
FIG. 6 shows the principle of creating dots of different ink weights.

The following describes the principle of formation of two different types of dots having different ink weights with the nozzles of a fixed diameter. FIG. 6 shows the relationship between the driving waveform of the nozzle Nz and the size of the ink particle Ip spouted from the nozzle Nz. The driving waveform shown by the broken line in FIG. 6 is used to create standard-sized dots. Output of a low voltage to the piezoelectric element PE in a division d2 deforms the piezoelectric element PE in the direction of increasing the cross section of the ink conduit 68, contrary to the case of FIG. 4. As shown in a state A of FIG. 6, an ink interface Me, which is generally referred to as meniscus, is thus slightly concaved inward the nozzle Nz. When the driving waveform shown by the solid line in FIG. 6 is used to abruptly lower the voltage in the division d2, the meniscus is more significantly concaved as shown in a state 'a', compared with the state A. An increase in voltage applied to the piezoelectric element PE in a division d3 causes the ink to be spouted, based on the principle discussed with FIG. 4. In the state A where the meniscus is only slightly concaved inward, a large ink droplet is spouted as shown in states B and C. In the state 'a' where the meniscus is significantly concaved inward, on the other hand, a small ink droplet is spouted as shown in states 'b' and 'c'.

Figure 7:
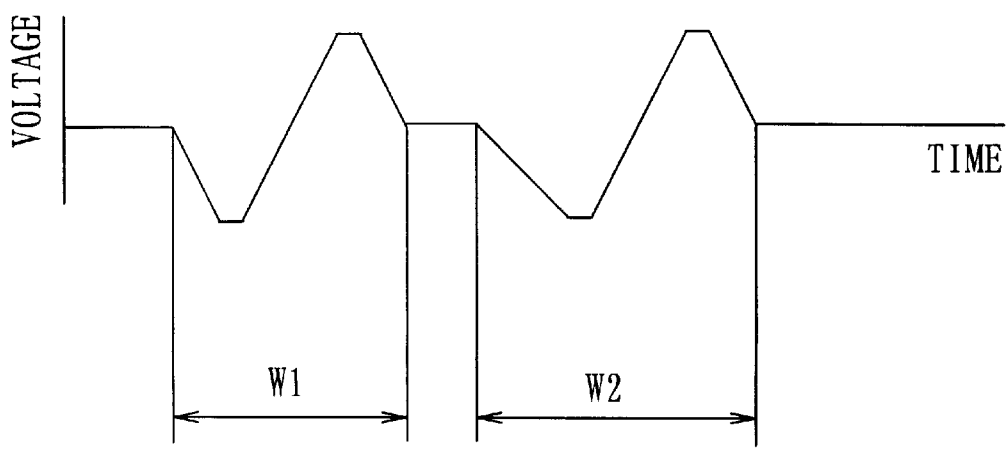
FIG. 7 shows driving waveforms of the nozzle in the printer 22.

As discussed above, the ink weight can be varied according to the rate of change in the divisions d1 and d2 where the driving voltage decreases. This embodiment provides two different driving waveforms, that is, one for creating dots of a smaller ink weight (hereinafter referred to as smaller dots) and the other for creating dots of a larger ink weight (hereinafter referred to as larger dots), based on the relationship between the driving waveform and the ink weight. The arrangement uses these two driving waveforms and enables the two different types of dots having different ink weights to be formed with the nozzle Nz of a fixed diameter. FIG. 7 shows driving waveforms used in this embodiment. A driving waveform W1 is used to form dots of a smaller ink weight, whereas a driving waveform W2 is used to form dots of a larger ink weight. As shown in FIG. 7, the structure of this embodiment successively outputs the driving waveforms W1 and W2 and selectively uses either one of these driving waveforms W1 and W2, thereby creating a dot selected between the dots of different ink weights corresponding to the selected driving waveform in each pixel.

Figure 8:
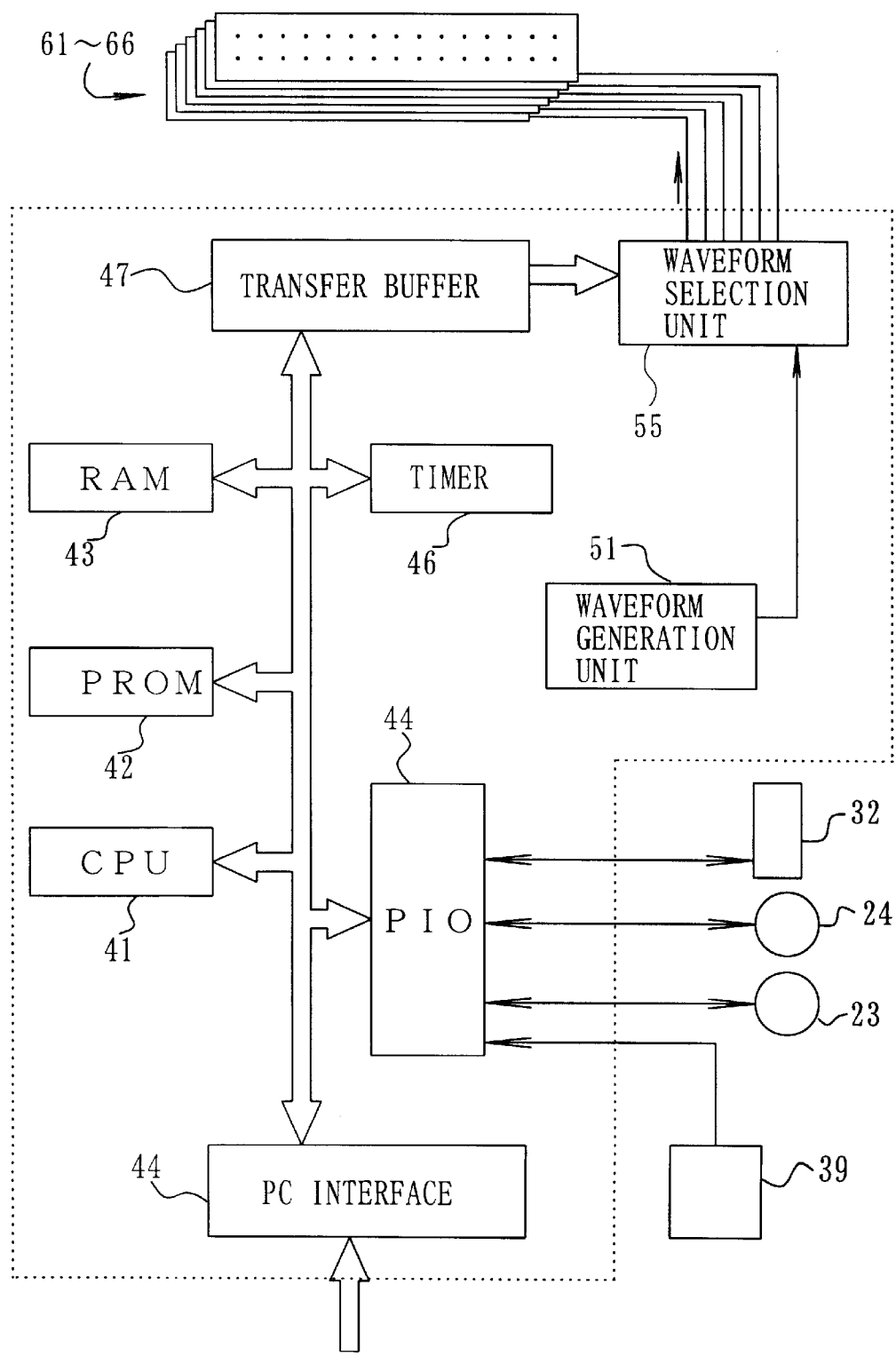
FIG. 8 is a block digram illustrating the internal structure of a control circuit 40 in the printer 22.

The following describes the internal structure of the control circuit 40 in the printer 22 and the process of driving the head 28 having the plurality of nozzles Nz shown in FIG. 5 by the driving waveforms. FIG. 8 is a block diagram schematically illustrating the internal structure of the control circuit 40. The control circuit 40 includes a CPU 41, a PROM 42, a RAM 43, a PC interface 44 that transmits data to and from the computer 90, a peripheral input-output unit (PIO) 45 that transmits signals to and from the sheet feed motor 23, the carriage motor 24, and the control panel 32, a timer 46 that counts the time, and a transfer buffer 47 that outputs dot on-off signals to the ink spout heads 61 through 66. These elements and the circuits are mutually connected via a bus 48. The control circuit 40 further includes a waveform generation unit 51 that outputs the driving waveforms (W1and W2 in FIG. 7) and a waveform selection unit 55 that selects a driving waveform in response to the signal from the transfer buffer 47 and outputs the selected driving waveform to the ink spout head 61 through 66. The control circuit 40 receives dot data processed by the computer 90 and outputs the processed dot data to the transfer buffer 47 at a predetermined timing.

Figure 9:
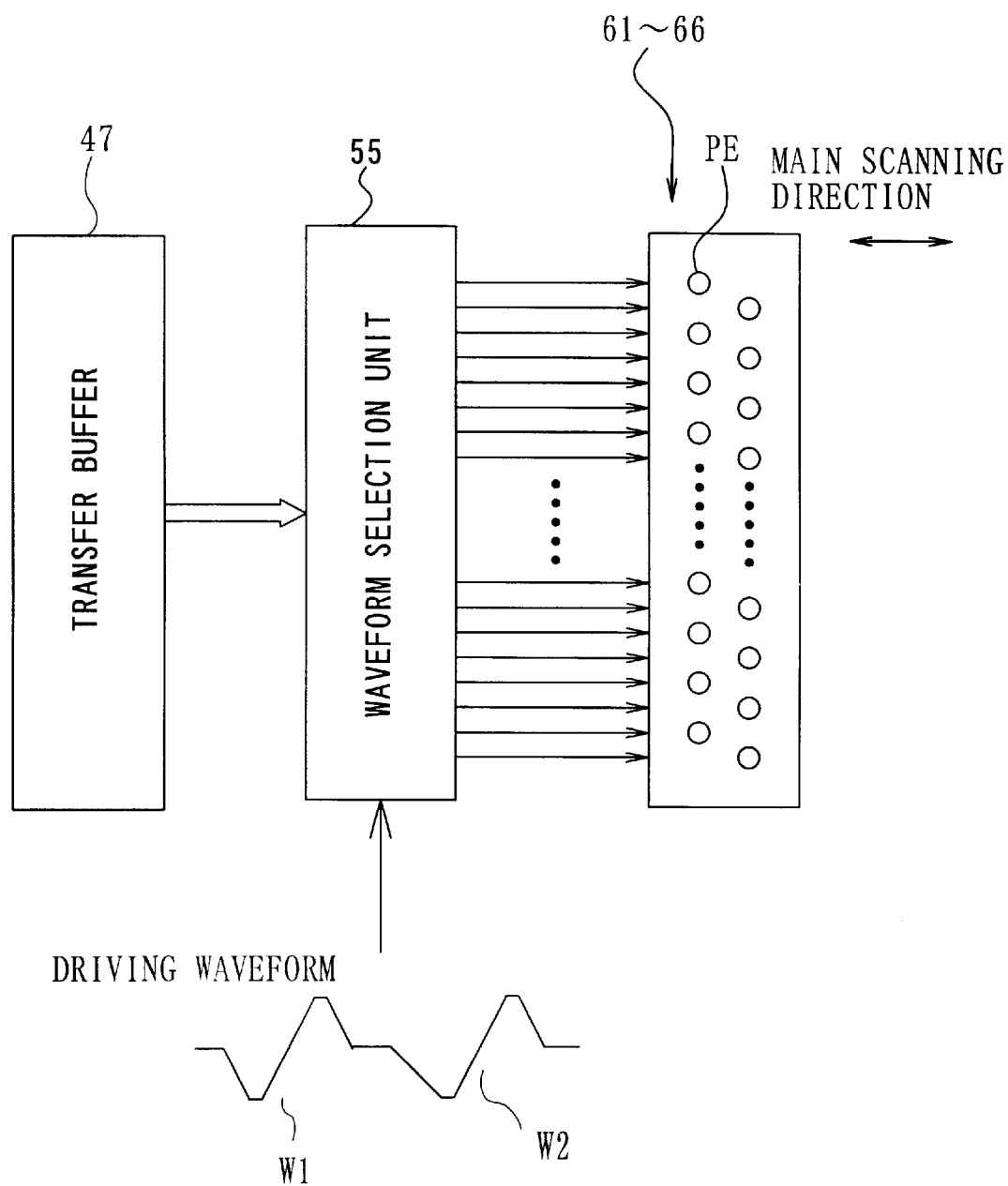
FIG. 9 illustrates the structure of a head driving circuit.

The control circuit 40 outputs signals to the ink spout heads 61 through 66 in the manner discussed below. FIG. 9 shows a process of outputting the selected driving waveform to one nozzle array for one of the ink spout heads 61 through 66. The nozzle array is connected to the waveform selection unit 55, which outputs the selected driving waveform to each of the nozzles constituting the nozzle array. The waveform selection unit 55 receives the driving waveforms output from the waveform generation unit 51, as well as the data output from the transfer buffer 47 for specifying the on-off state of the respective nozzles. The waveform selection unit 55 then selects the driving waveform to be output to each nozzle, in response to the signal input from the transfer buffer 47. Concretely speaking, the waveform selection unit 55 selects the driving waveform W1 for the nozzles that create the smaller dots and the driving waveform W2 for the nozzles that create the larger dots, while selecting no driving waveform for the nozzles that do not create any dots. In response to the output of the driving waveform selected for each nozzle, the ink particle corresponding to the output driving waveform is spouted from the nozzle.

As shown in FIG. 5, the ink spout heads 61 through 66 are arranged in the feeding direction of the carriage 31. The respective nozzle arrays reach a specific position on the sheet of paper P at different timings. The CPU 41 accordingly takes into account the positional deviations of the respective nozzles included in the ink spout heads 61 through 66 and outputs the on-off signals of the respective dots at the required timings via the transfer buffer 47, so as to create the dots of the respective colors. The output of the on-off signals is controlled by taking into account the two-column nozzle arrangement in the respective ink spout heads 61 through 66.

Figure 11:
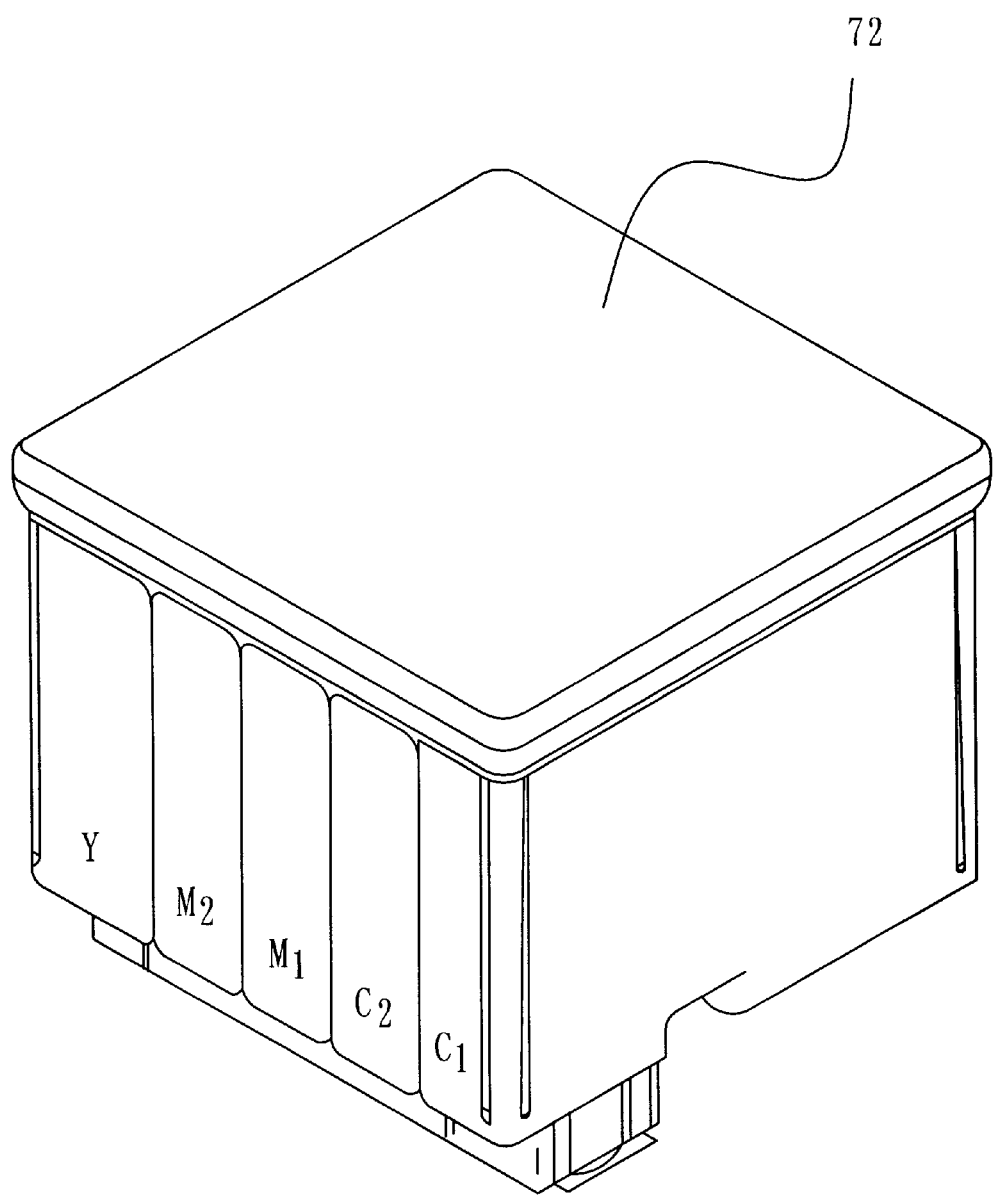
FIG. 11 shows the structure of a color ink cartridge 72 used in the printer 22.

The inks used in the printer 22 of the embodiment have the following compositions. As described previously, the print head 28 in the printer 22 of the embodiment has the ink spout heads 63 and 65 for light cyan ink and light magenta ink as well as those for the standard four color inks C, M, Y, and K. The table of FIG. 10 shows the components of these inks. The cyan ink of standard density (shown as C1 in FIG. 10) has 3.6% by weight of the dye Direct Blue 199, whereas the light cyan ink (shown as C2 in FIG. 10) has 0.9% by weight of Direct Blue 199, which is one quarter the density of the cyan ink C1. The magenta ink of standard density (shown as M1 in FIG. 10) has 2.8% by weight of the dye Acid Red 289, whereas the light magenta ink (shown as M2 in FIG. 10) has 0.7% by weight of Acid Red 289, which is one quarter the density of the magenta ink M1. The yellow ink Y has 1.8% by weight of the dye Direct Yellow 86, and the black ink Bk has 4.8% by weight of the dye Food Black 2. The lower-density inks are not provided for the yellow ink or the black ink. All the inks are adjusted to have the substantially equal viscosity of about 3 [mPa·s] and the substantially equal surface tension. This arrangement enables the piezoelectric elements PE for the respective ink spout heads 61 through 66 to be controlled in the same manner irrespective of the variety of inks used for dot generation. In this embodiment, the black ink is reserved in the black ink cartridge 71 of a single module, whereas the color inks are reserved in the color ink cartridge 72 of plural modules that are integrated with one another as shown in FIG. 11.

As described previously, the printer 22 of the embodiment can create dots of two different ink weights. In this embodiment, the dots of a smaller ink weight (smaller dots) are formed by the ink weight of 5 ng (nanograms), whereas the dots of a larger ink weight (larger dots) are formed by the ink weight of 20 ng. The lightness of each dot is approximated by the product of the dye weight and the ink weight.

The table of FIG. 10 also shows the approximated lightness of the respective dots. The lightness of the smaller dot (=18.0) formed by the cyan ink C1 is substantially identical with the lightness of the larger dot (=18.0) formed by the light cyan ink C2. The lightness of the smaller dot (=14.0) formed by the magenta ink M1 is substantially identical with the lightness of the smaller dot (=14.0) formed by the light magenta ink M2.

In the case where the dots of different densities and different ink weights are provided for the purpose of expressing multi-tones, one possible setting varies the lightness in four steps, from the smaller dots formed by the low-density, light ink (hereinafter referred to as the smaller light dots) to the larger dots formed by the high-density, dark ink (hereinafter referred to as the larger dark dots). This embodiment, however, sets the lightness of the larger dots formed by the low-density, light ink (hereinafter referred to as the larger light dots) substantially equal to the lightness of the smaller dots formed by the high-density, dark ink (hereinafter referred to as the smaller dark dots). This arrangement enhances the degree of freedom for the selection of the dots and attains a variety of effects discussed later. Although the two different types of dots have the same lightness in this embodiment, the strict coincidence of the lightness is not essential.

In the printer 22 of the embodiment having the hardware structure discussed above, while the sheet feed motor 23 rotates the platen 26 and the other related rollers to feed the sheet of paper P (hereinafter referred to as the sub-scan), the carriage motor 24 drives and reciprocates the carriage 31 (hereinafter referred to as the main scan), simultaneously with actuation of the piezoelectric elements PE on the respective ink spout heads 61 through 66 of the print head 28. The printer 22 accordingly sprays the respective color inks to create dots and thereby forms a multi-color image on the sheet of paper P.

B. Dot Generation Routine in First Embodiment

The following describes a dot generation routine executed in the first embodiment. By way of example, the following description refers to creation of four different types of dots (the smaller dark dot, the larger dark dot, the smaller light dot, and the larger light dot) with respect to the color, cyan. The same processing is carried out for magenta that can also create four different types of dots. The processing without the part corresponding to the smaller dark dot and the larger light dot is applied to yellow and black that do not have inks of different densities.

Figure 12:
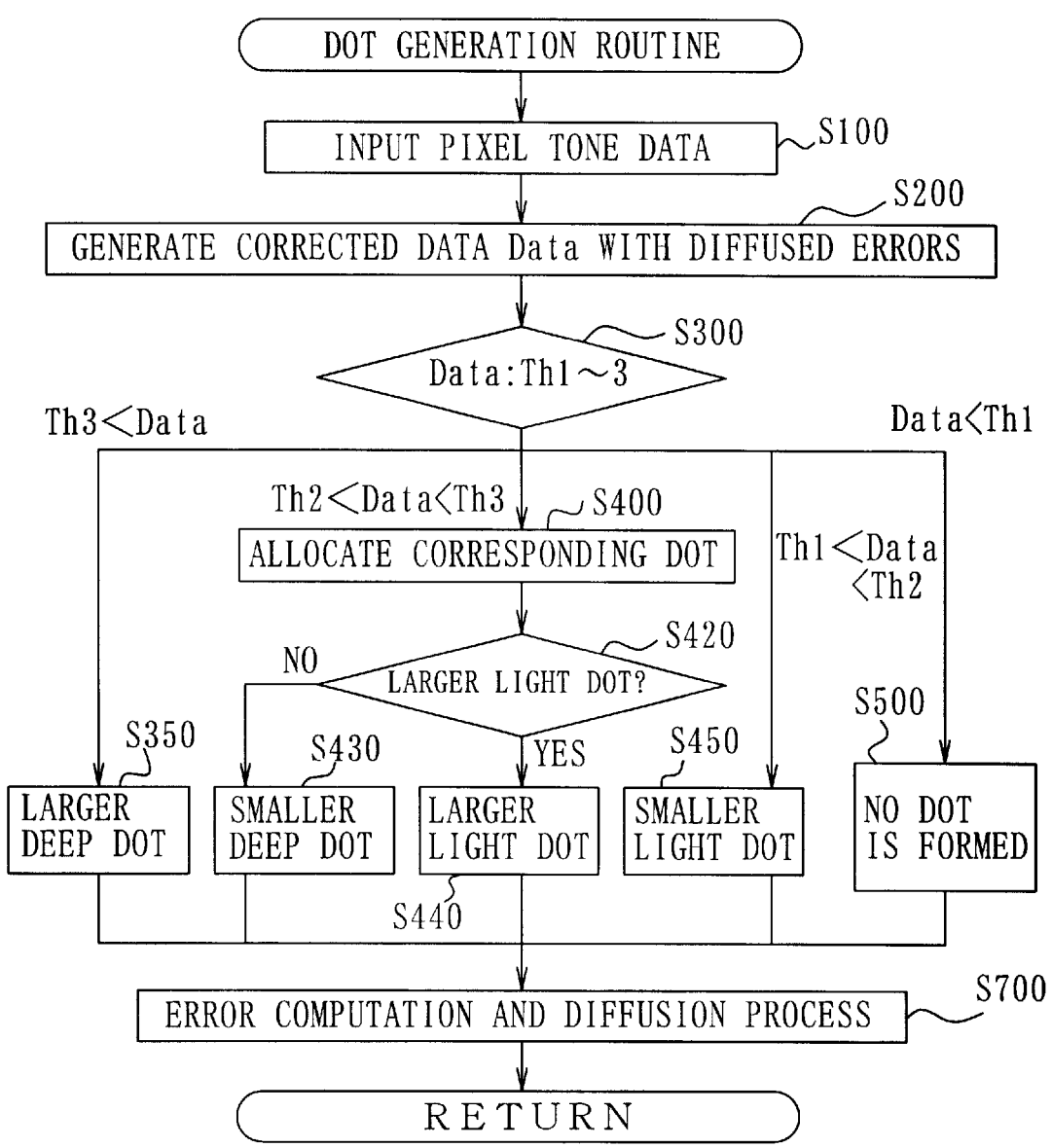
FIG. 12 is a flowchart showing a dot generation routine executed in a first embodiment of the present invention.

FIG. 12 is a flowchart showing the dot generation routine executed in the first embodiment. This routine is part of the processing executed by the halftone module 99 of the printer driver 96 and is carried out by the CPU of the computer 90 in this embodiment.

When the program enters the dot generation routine of FIG. 12, the CPU receives pixel tone data with respect to a target pixel at step S100. The pixel tone data input here is color-corrected image data obtained by converting a color image into dot-based image data of R, G, and B color components and making the RGB image data undergo the color correction according to the ink colors C, M, and Y used by the printer 22 and the calorimetric characteristics of the printer 22. In this embodiment, the tone data is 8-bit data having the tone in the range of 0 to 255.

Figure 13:
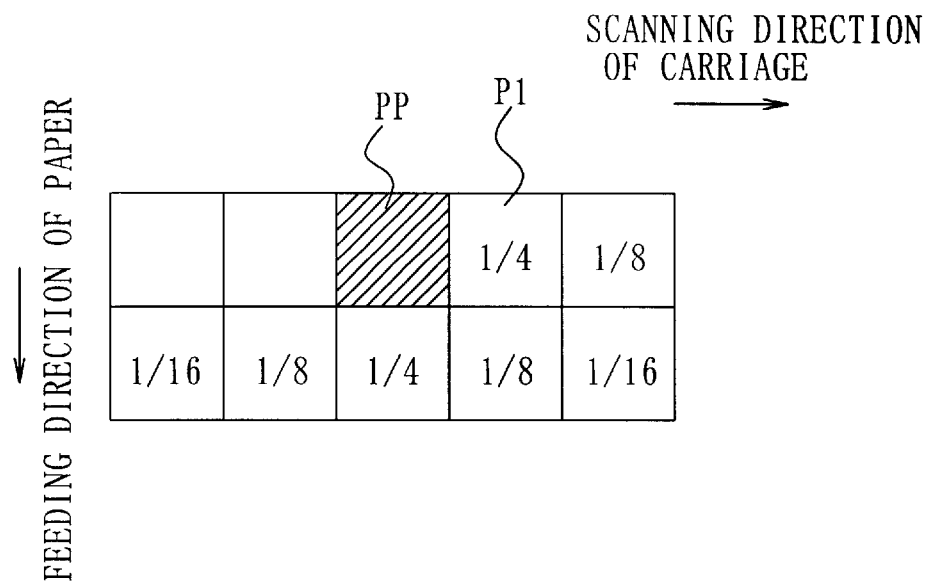
FIG. 13 shows weighting coefficients used in the error diffusion process.

The CPU then reflects diffusion errors from the peripheral pixels, which have already been processed, on the input data and thereby generates corrected image data Data at step S200. This embodiment adopts the error diffusion process as described later, in order to make the tone expression of the resulting printed image as close as possible to the tone expression of the original color image. The error diffusion process distributes a density error occurring in a target pixel, which is currently being processed, into peripheral pixels in the vicinity of the target pixel with predetermined weights. The procedure of step S200 thus reads the corresponding errors and makes the errors reflect on the target pixel to be printed currently. FIG. 13 shows distribution of the error from a target pixel PP to peripheral pixels with some weights. The density error of the target pixel PP is distributed into the pixels after the target pixel PP in the scanning direction of the carriage 30 and in the feeding direction of the sheet of paper P with predetermined weights ¼, ⅛, and ¹⁄₁₆. The details of the error diffusion process will be discussed later.

The CPU compares the corrected image data Data with predetermined threshold values Th1 through Th3 at step S300. The predetermined values hold the relationship of Th1<Th2<Th3 and vary with a variation in tone value. In the case where the corrected image data is not less than the threshold value Th3, that is, when the tone value of the corrected image data Data is included in a highest tone area, the CPU executes the processing to create a larger dark dot having the highest density per unit area at step S350. The concrete procedure of step S350 sets the data that specifies formation of a large dark dot as the data output to the transfer buffer 47. In the case where the corrected image data Data is between the predetermined threshold values Th2 and Th3, that is, when Th2<Data<Th3, the tone value of the corrected image data Data is included in a half tone area. There are two different types of dots, that is, the larger light dot and the smaller dark dot, which can express the half tone. The CPU accordingly allocates the corresponding dot to either one of these two types of dots at step S400.

Figure 22:
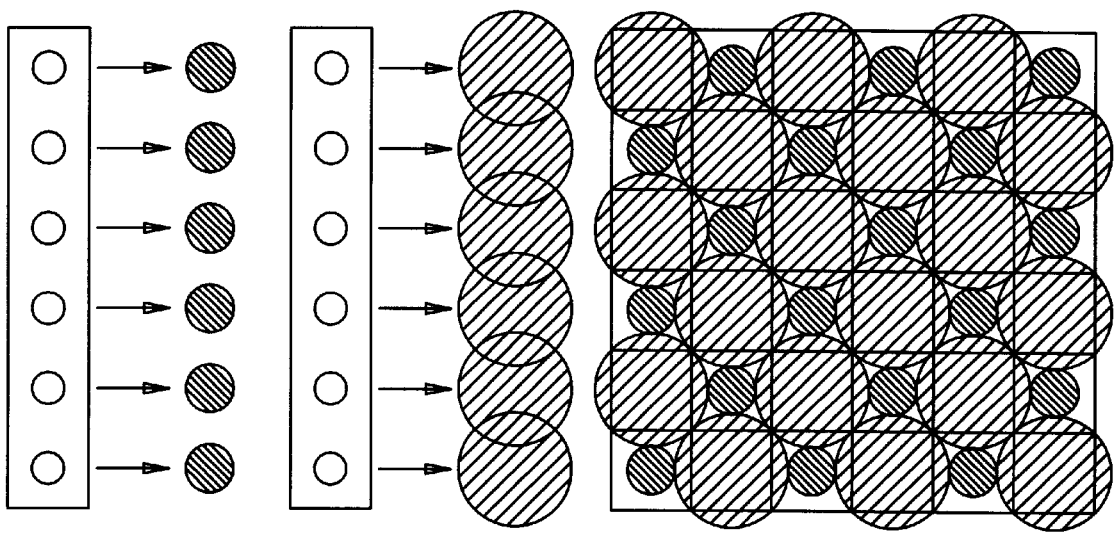
FIG. 22 shows the state of recording both larger dots and smaller dots without any unevenness of dot formation.

The structure of this embodiment allocates the corresponding dots according to a predetermined pattern. FIG. 22 shows a relatively simple available pattern, in which the smaller dark dots and the larger light dots are arranged checker wise. In this pattern, for example, when the sum of the positional data of a certain dot position in the main scanning direction and in the sub-scanning direction is an even, a smaller dark dot is generated. When the sum of the positional data is an odd, on the other hand, a larger light dot is generated. The positional data of each dot position can be utilized in a similar manner for distribution of the dots according to another pattern.

Figure 14:
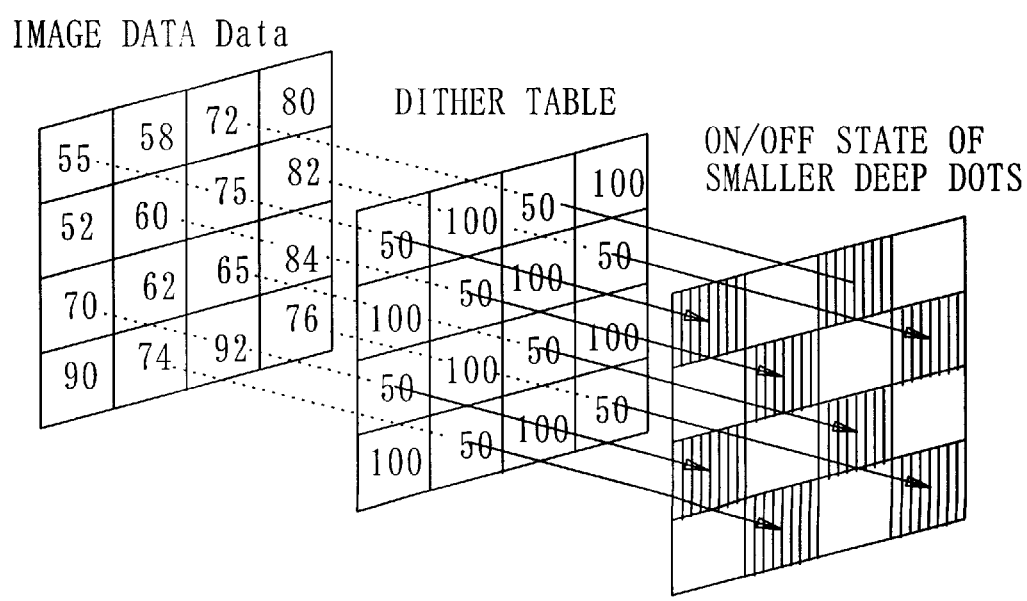
FIG. 14 shows the process of determining the on/off state of dots according to a dither matrix.

Another possible procedure utilizes a dither table for the distribution of the dots. The dither table gives threshold values for generating smaller dark dots. FIG. 14 shows a dither table as an example. The dither table of FIG. 14 is a 4×4 threshold matrix, wherein Th2=50 and Th3=100 on the assumption that the data corresponding to the half tone have the tone values of 50 to 100 out of the whole tone range of 0 to 255. In the example of FIG. 14, the half tone image data Data is compared with the threshold value stored in the dither table, and a smaller dark dot is generated at the position where the image data Data is greater than the threshold value. Larger light dots are generated at the remaining positions other than those with the smaller dark dots. Since the half tone image data Data are always present in the range of the threshold value Th2 and the threshold value Th3, the dither table representing a distribution of these threshold values Th2 and Th3 enables the smaller dark dots and the larger light dots to be generated in the half tone according to a preset pattern. The pattern may be specified experimentally to cancel the banding by taking into account the ink duty of the paper, that is, the allowable quantity of ink per unit area of the paper.

When the dither table includes values other than the threshold values Th2 and Th3, the pattern of the appearance of the smaller dark dots and the larger light dots is varied in the half tone according to the image data. Another dither table of a greater size may be used instead of the 4×4 dither table shown in FIG. 14.

Referring back to the flowchart of FIG. 12, after the selection of either the smaller dark dot or the larger dark dot in the half tone at step S400, when it is determined at step S420 that a larger light dot is to be generated, the CPU executes the processing to create a larger light dot at step S440. Otherwise the CPU executes the processing to create a smaller dark dot at step S430.

In the case where the corrected image data Data is between the predetermined threshold values Th2 and Th1, that is, when $Th1 \leq Data \leq Th2$, the CPU executes the processing to generate a smaller light dot having the lowest density per unit area at step S450. In the case where the image data Data is smaller than the predetermined threshold value Th1, that is, when Data<Th1, the tone value of the image data Data is included in a highlighted area and the CPU accordingly creates no dot at step S500.

This procedure specifies which type of the dot should be generated with respect to each pixel. This includes the case where no dot is created. The CPU subsequently carries out the error computation and error distribution process based on the setting at step S700. The error here implies a difference in lightness between the image data Data corrected at step S200 and the dot actually formed. Whereas the image data Data can continuously take the tone values in the range of 0 to 255, the lightness expressed by formation of dots has only some discrete values. This causes the error. If a larger dark dot having the evaluation value of lightness equal to 255 is created when the tone value of the image data Data is equal to 199, there is a lightness error of 255−199= 56. This implies that the density of the dot actually created is higher than the desired density to be expressed. The error ERR is generally expressed as ERR=Data−RV, where RV denotes the evaluation value of lightness specified according to the type of the dot created.

The error diffusion process distributes the calculated error of the target pixel PP, which is currently being processed, into the peripheral pixels in the vicinity of the target pixel PP with predetermined weights (see FIG. 13). It is naturally understood that only non-processed pixels can receive distributed errors. The error of the target pixel PP is accordingly distributed into only the subsequent pixels after the target pixel PP in the scanning direction of the carriage 30 and the feeding direction of the sheet of paper P as shown in FIG. 13. In the above example, in the case where the error is equal to 56, the error distributed into a pixel P1, which is adjacent to the currently processed pixel PP, is 14 that is one quarter the whole error 56. This error is reflected on the subsequently processed pixel P1 at step S200. If the image data of the pixel P1 has the tone value 214, for example, the corrected image data has the tone value 200 that is obtained by subtracting the diffused error 14 from the original tone value 214. This procedure is repeatedly executed. Although each pixel has some lightness error, the repeated processing enables the resulting printed image to have tones corresponding to the input image data. The combination of the weights shown in FIG. 13 is only an example, and any combination of weights can be applied for this embodiment.

The CPU carries out the processing to cause the printer 22 to create the respective dots based on the results of the dot generation routine shown in the flowchart of FIG. 12. There are a variety of known processes applicable for creating dots according to the structure of the printer 22, although the details of the processing are not described here. The printer 22 of this embodiment can create dots of different ink weights for the respective pixels. The results specified in the dot generation routine are successively output for the respective pixels, so that the dots of different ink weight are recorded to form a resulting image.

Another arrangement consistently create either larger dots or smaller dots in each main scan. This arrangement enhances the driving frequency of the head and improves the printing speed. The following describes a variety of available configurations that generate dots of different ink weights while consistently creating either larger dots or smaller dots in each main scan. The process discussed below adopts the well-known overlap-type dot recording method.

Figure 15:
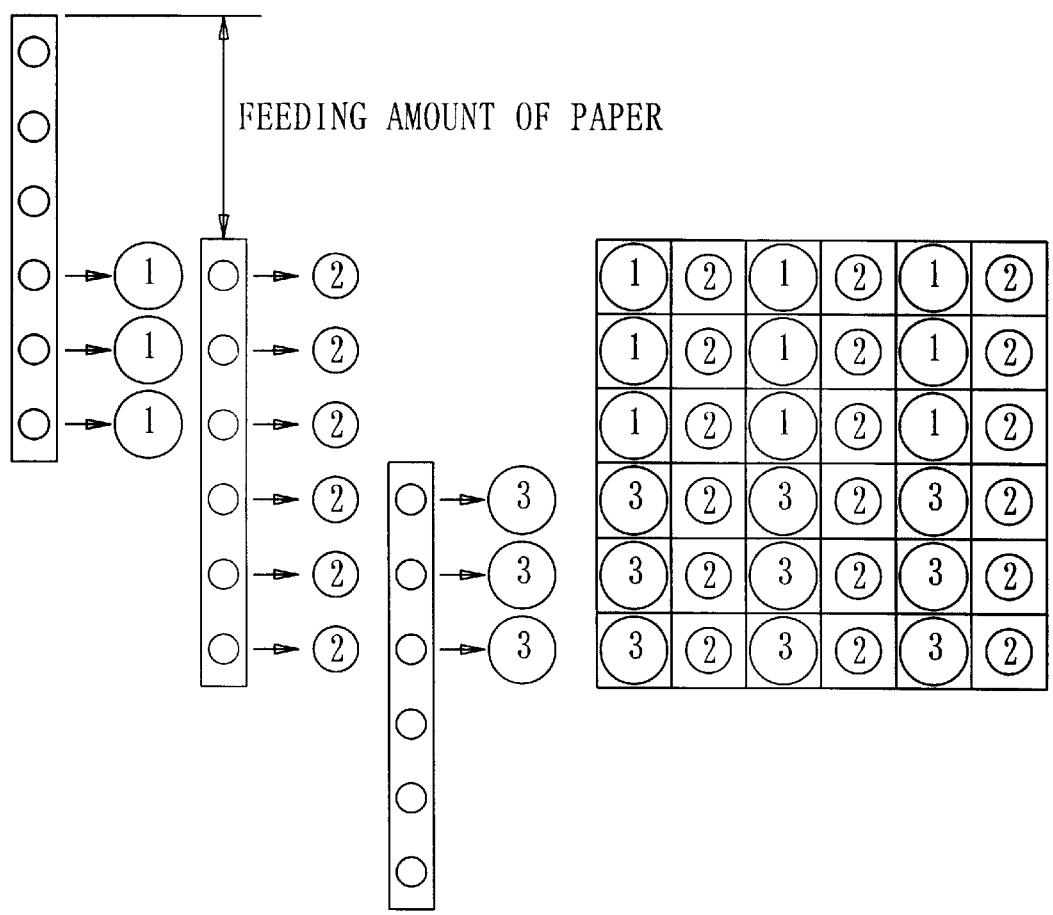
FIG. 15 shows a first scanning configuration in which both larger dots and smaller dots are recorded by the printer 22.

FIG. 15 schematically illustrates a first scanning configuration in which both larger dots and smaller dots are created in a 6×6 area with a head having six nozzles. The left part of FIG. 15 shows the state of ink spout corresponding to the ordinal number of scanning of the head, and the right part shows the resulting dots. The numerals allocated to the respective dots represent the ordinal numbers of scanning of the head. As shown in FIG. 15, the first main scan creates larger dots alternately in the main scanning direction with the lower-half nozzles on the head. After a feed of the paper by 3 dots in the sub-scanning direction, the second main scan creates smaller dots alternately in the main scanning direction with all the nozzles on the head. After a further feed of the paper by another 3 dots in the sub-scanning direction, the third main scan creates larger dots alternately in the main scanning direction with the upper-half nozzles on the head. This configuration records each raster line by two scans, thereby enabling the larger dots and the smaller dots to be present at the 1:1 ratio.

Figure 16:
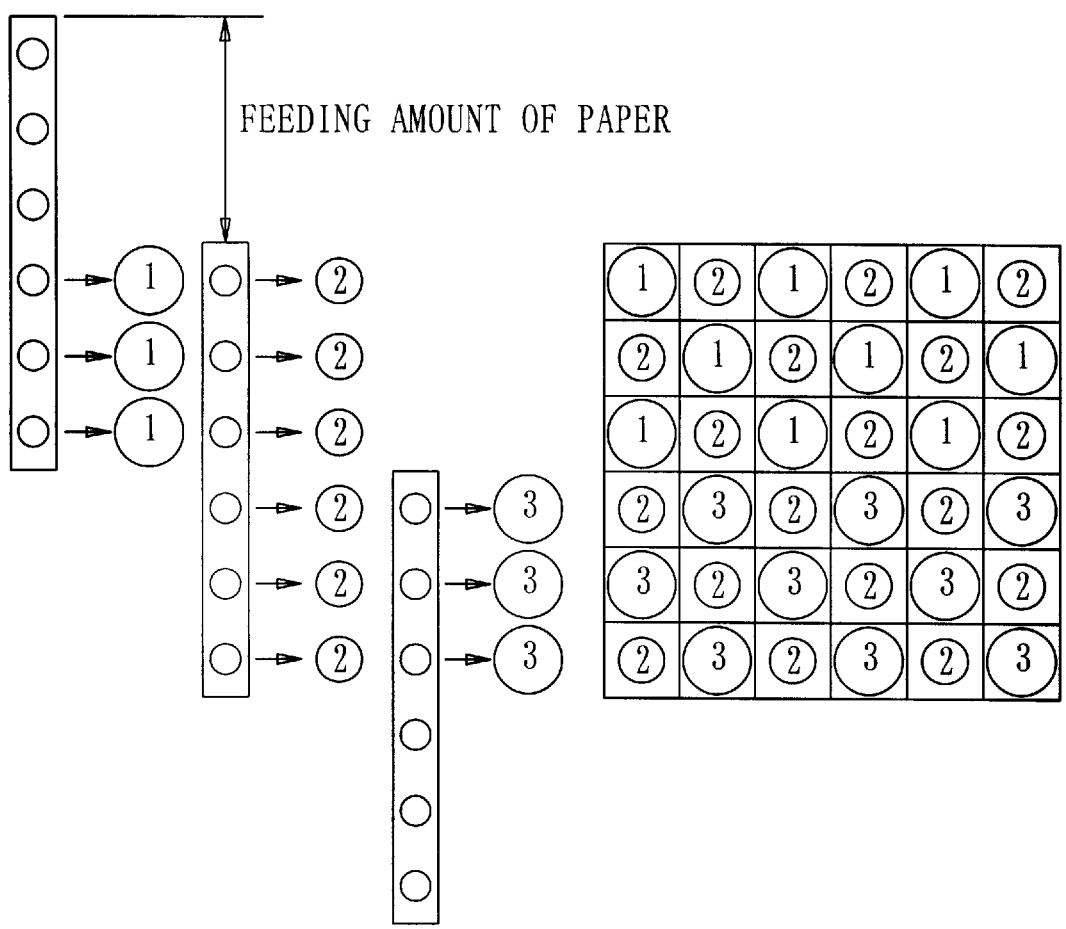
FIG. 16 shows a second scanning configuration in which both larger dots and smaller dots are recorded by the printer 22.

FIG. 16 schematically illustrates a second scanning configuration. As long as the ink weights are fixed, dots can be formed at any desirable positions in each main scan. For example, larger dots and smaller dots are recorded checkerwise as shown in FIG. 16.

Figure 17:
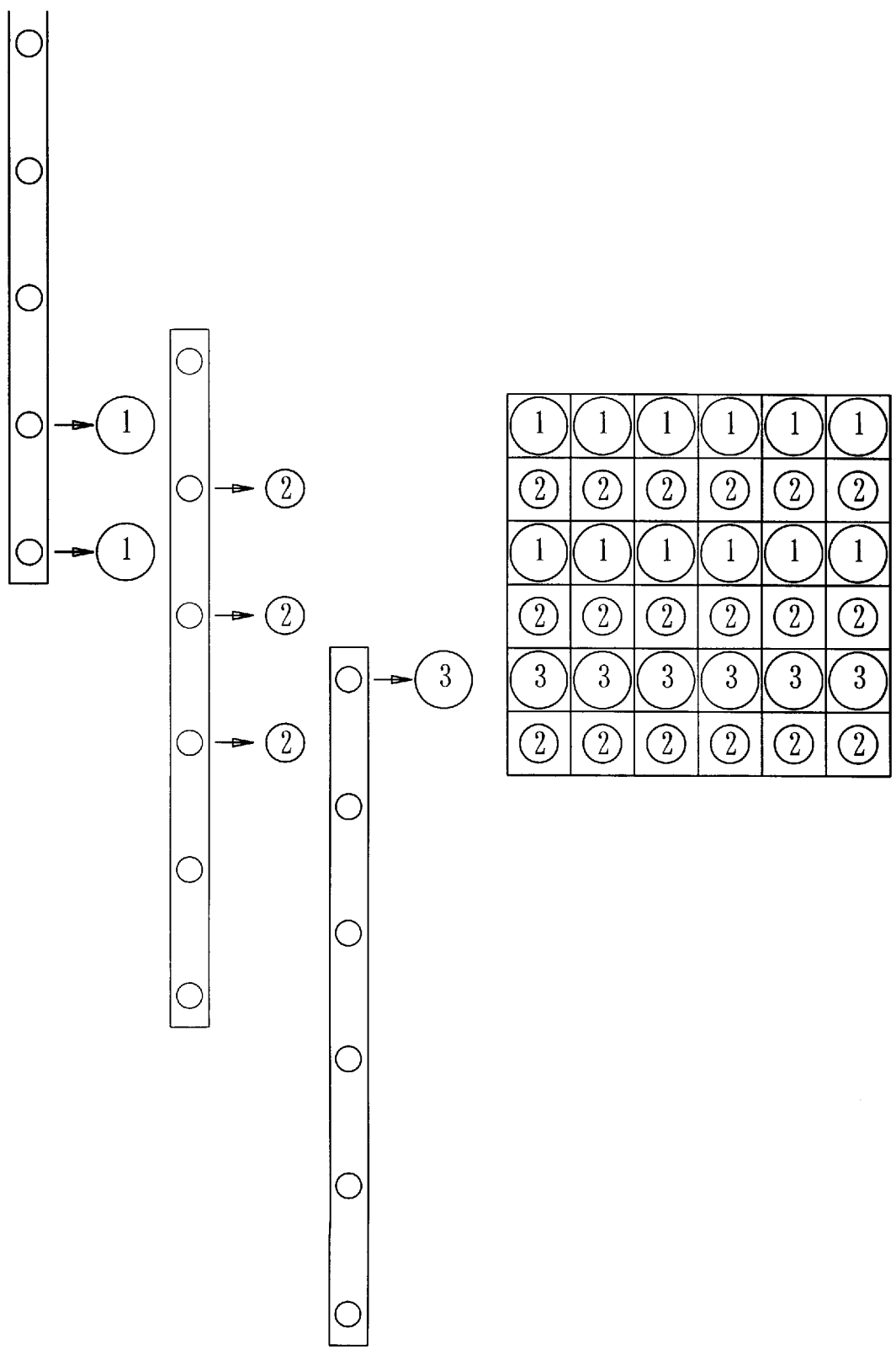
FIG. 17 shows a third scanning configuration in which both larger dots and smaller dots are recorded by the printer 22.

FIG. 17 schematically illustrates a third scanning configuration.

While the same six nozzles as those in the first and the second configurations are used for printing in the third configuration, the nozzle pitch is twice the dot recording density in the sub-scanning direction. The first main scan creates larger dots with the lower two nozzles. In this case, all the dots on each raster line are formed by one main scan. After a feed of the paper by 5 dots in the sub-scanning direction, the second main scan creates smaller dots with the middle three nozzles. After a further feed of the paper by another 5 dots in the sub-scanning direction, the third main scan creates larger dots with the upper-most nozzle. This configuration enables the larger dots and the smaller dots to be present at the 1:1 ratio while either larger dots or smaller dots are recorded consistently to form each raster line.

Figure 18:
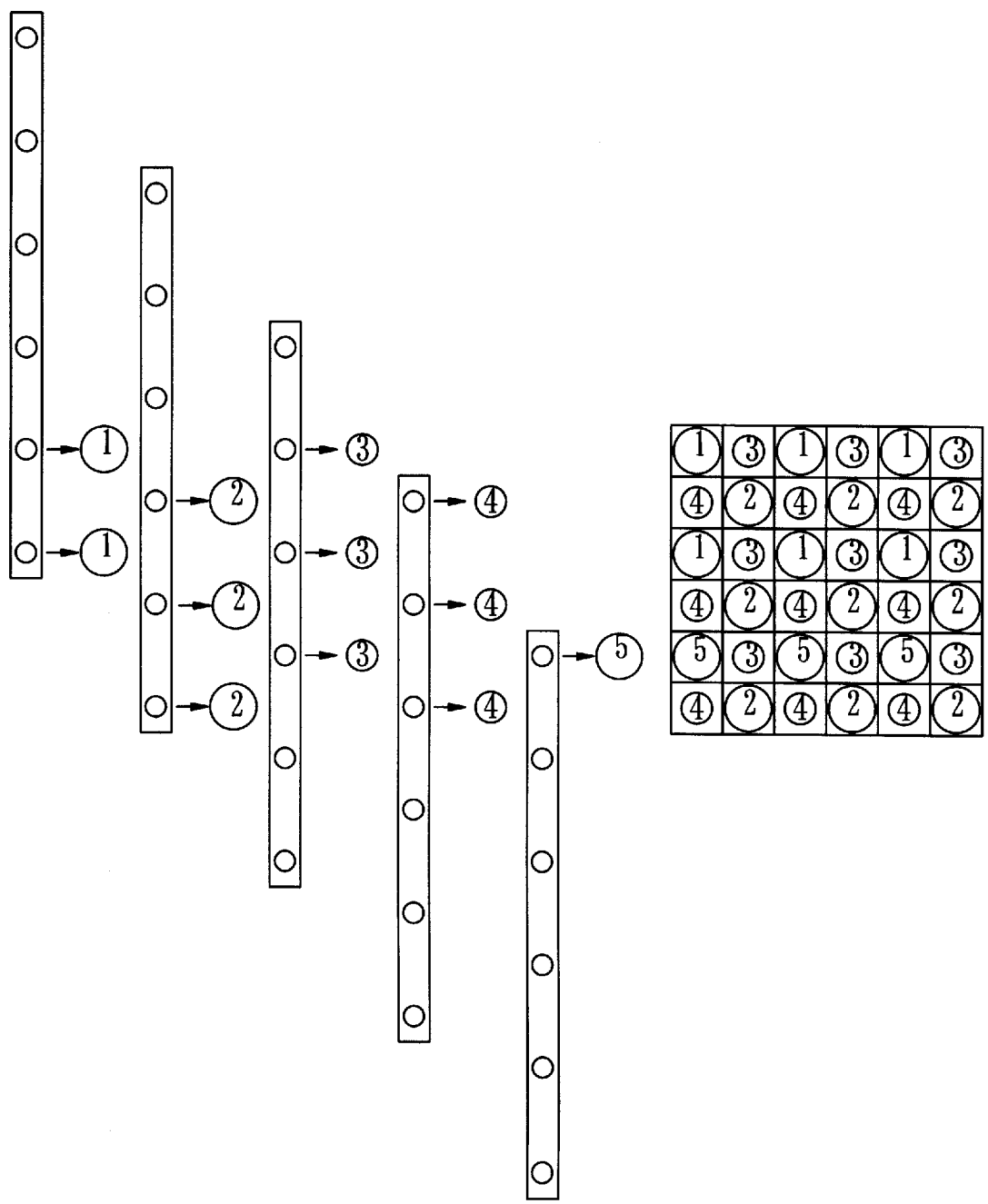
FIG. 18 shows a fourth scanning configuration in which both larger dots and smaller dots are recorded by the printer 22.

FIG. 18 schematically illustrates a fourth scanning configuration.

The nozzle pitch in the fourth configuration is identical with that in the third configuration shown in FIG. 17. In this case, dots are created while the sheet of paper is fed by 3 dots at a time in the sub-scanning direction. This enables the larger dots and the smaller dots to be recorded checkerwise as shown in FIG. 18.

Figure 19:
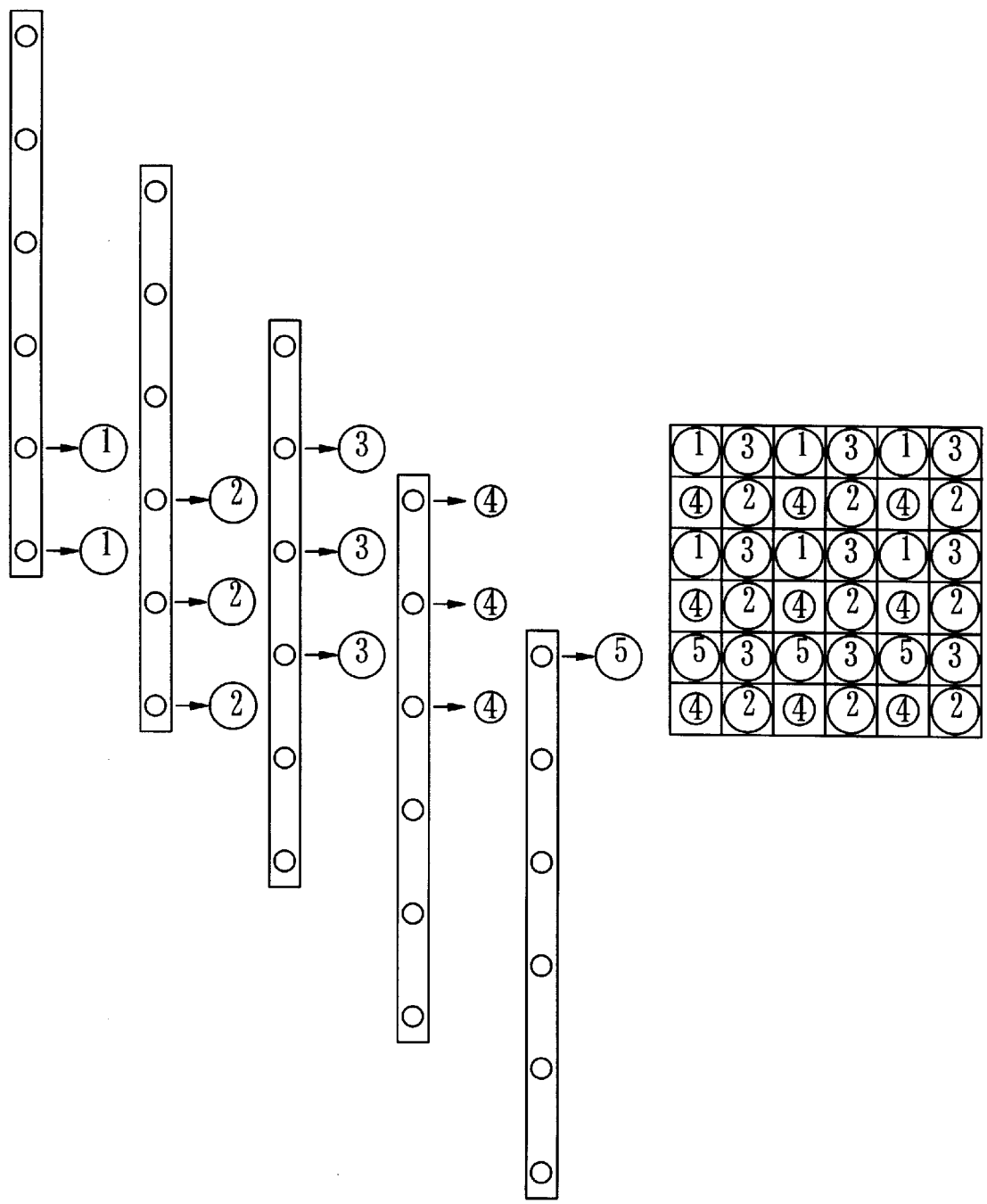
FIG. 19 shows a fifth scanning configuration in which both larger dots and smaller dots are recorded by the printer 22.

FIG. 19 schematically illustrates a fifth scanning configuration. The nozzle pitch in the fifth configuration is identical with that in the third configuration shown in FIG. 17. The relationship between the ordinal number of scanning of the head and the nozzles used for spouting ink and actually creating dots in the fifth configuration is similar to that in the fourth configuration shown in FIG. 18. The difference is that the third main scan creates larger dots in the fifth configuration of FIG. 19 while the third main scan creates smaller dots in the fourth configuration of FIG. 18. This enables the larger dots and the smaller dots to be present at the 3:1 ratio. The larger dots and the smaller dots can be inverted naturally. In that case, the ratio of the larger dots and the smaller dots can also be inverted.

As described above, the structure of recording each raster line by two or more scans can freely vary the ratio of the larger dots to the smaller dots and the pattern of the arrangement of these dots. Each main scan consistently creates either larger dots or smaller dots, thereby enabling high-speed printing. Although the above configurations refer to the case with six nozzles, these are applicable to the case with 32 nozzles.

Figure 20:
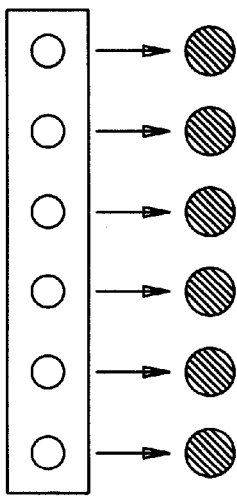
FIG. 20 shows the state of recording only smaller dots without any unevenness of dot formation.
Figure 20:
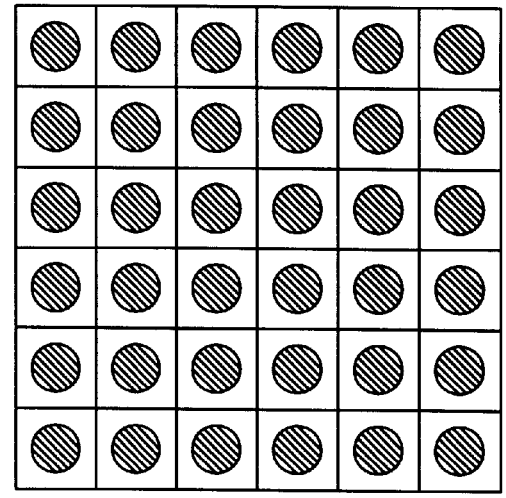
Figure 21:
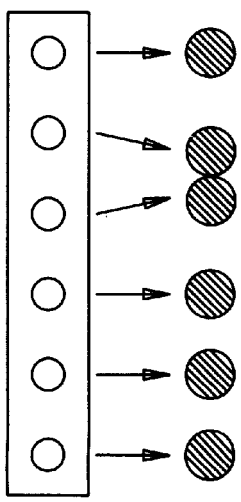
FIG. 21 shows the state of recording only smaller dots with some unevenness of dot formation.
Figure 21:
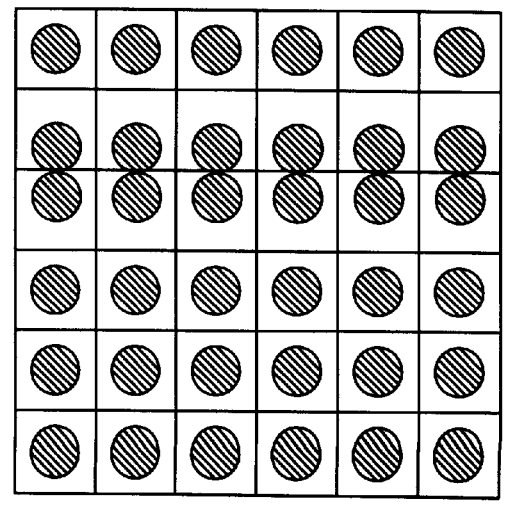

The printing apparatus described above can create both the smaller dark dots and the larger light dots in the half tone, thereby effectively preventing the banding, that is, unevenness of formation of dots due to the mechanical manufacturing error of the head. FIGS. 20 and 21 show the example where only small dots are created to record a certain area. FIGS. 20 shows the state without any mechanical manufacturing error of the head. In this case, there is no unevenness of formation of dots. FIG. 21 shows the state with some mechanical manufacturing error of the head. When the head has some mechanical manufacturing error, scattering in the spouting direction of ink prevents dots from being formed uniformly and thereby causes the banding as shown in FIG. 21. Although the unevenness of formation of dots appears only in the sub-scanning direction in the example of FIG. 21, such unevenness may also arise in the main scanning direction.

Figure 23:
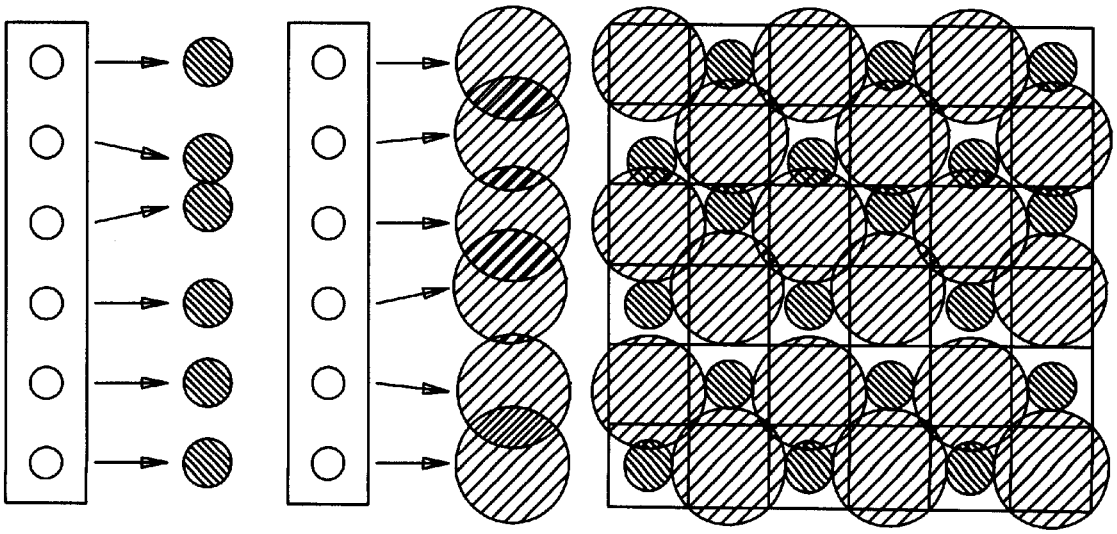
FIG. 23 shows the state of recording both larger dots and smaller dots with some unevenness of dot formation.

FIGS. 22 and 23 show the example where both larger light dots and smaller dark dots are created to record a certain area by the printing apparatus of this embodiment. In this example, the larger circles represent the larger light dots and the smaller circles represent the smaller dark dots. FIG. 22 shows the state without any mechanical manufacturing error of the head, and FIG. 23 shows the state with some mechanical manufacturing error of the head. The comparison between FIGS. 23 and 21 clearly shows that the unevenness of formation of dots is made significantly inconspicuous in the state of FIG. 23. This is not the special effect occurring only in the specific pattern shown in FIG. 23 but the general effect in any arrangement where both the larger light dots and the smaller dark dots are recorded.

This effect is ascribed to the following reasons. One reason is that the light dots and the dark dots are formed from inks of different densities with different heads. The respective heads have different mechanical manufacturing errors. This causes the unevenness of formation of dots to appear in various directions and thereby cancel the unevenness of dot formation in the whole resulting image. Another reason is that the larger dots have large overlaps with the adjoining dots and make the unevenness of formation of dots inconspicuous.

With a view to preventing the banding, another possible method creates only larger dots. In the case where only larger dots are created to record a certain area, the dots may exceed the ink duty of the paper, that is, the allowable quantity of ink per unit area of the paper, which results in an ink blot. The printing apparatus of the embodiment uses both the larger light dots and the smaller dark dots by taking into account the ink duty and is thereby free from such a problem. The printing apparatus of the embodiment can freely set the ratio of the larger light dots to the smaller dark dots and may record only the larger light dots on the recording sheet having the sufficiently high ink duty.

C. Dot Generation Routine in Second Embodiment

Figure 24:
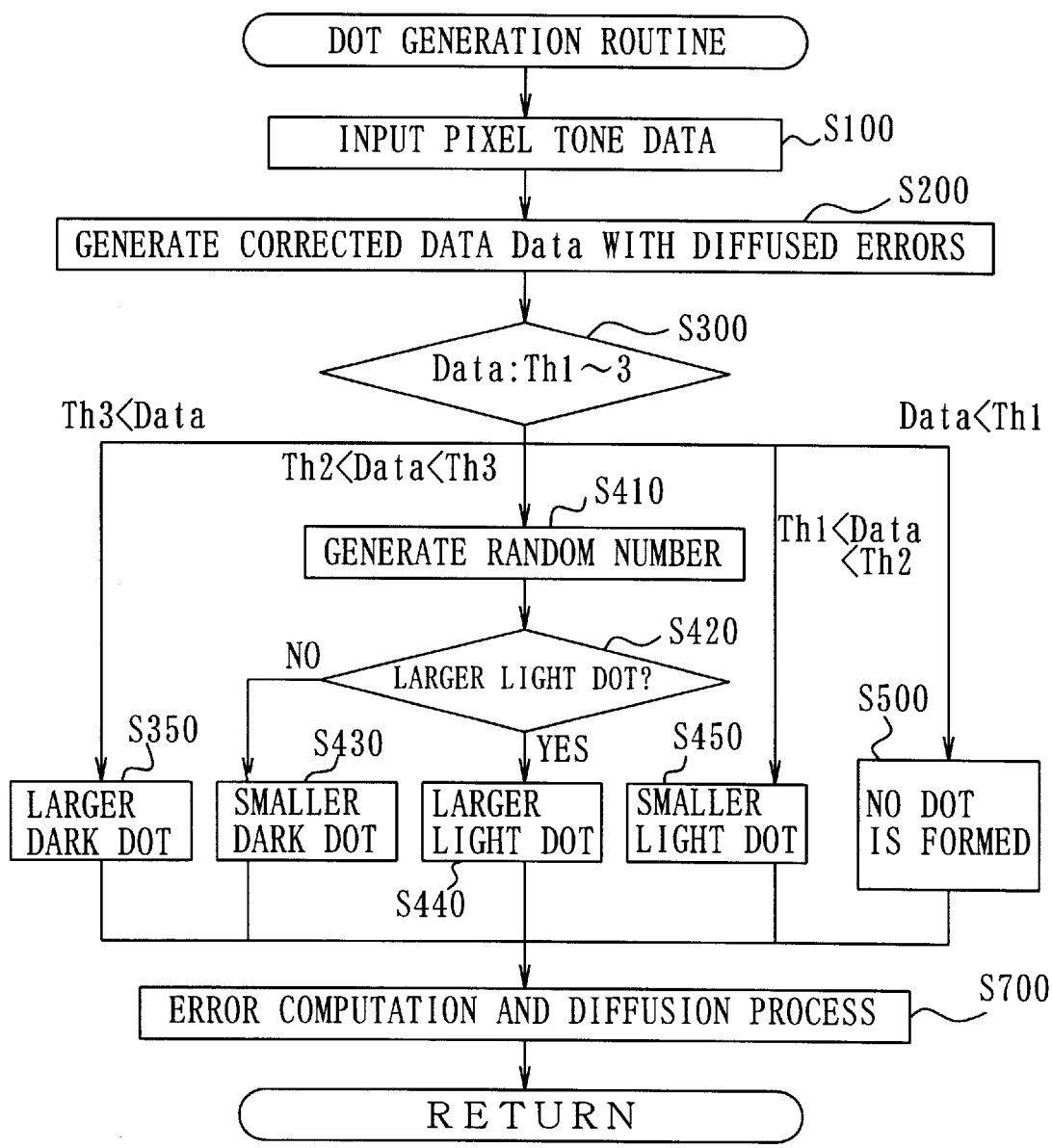
FIG. 24 is a flowchart showing a dot generation routine executed in a second embodiment of the present invention.

The following describes another printing apparatus as a second embodiment according to the present invention. The printing apparatus of the second embodiment has the same hardware structure as that of the first embodiment, but carries out a different dot generation routine. FIG. 24 is a flowchart showing the dot generation routine executed in the second embodiment.

The dot generation routine of the second embodiment shown in the flowchart of FIG. 24 is similar to that of the first embodiment shown in the flowchart of FIG. 12, except the allocation of the corresponding dot to either the smaller dark dot or the larger light dot in the half tone (step S400 in FIG. 12). Only the processing in the half tone that is different from the first embodiment is described here.

The second embodiment generates a random number with respect to the image data Data in the half tone that satisfies the relationship of Th2<Data<Th3, and determines which of the smaller dark dot and the larger light dot is to be created at step S410. By way of example, when the random number generated in the range of 0 to 1 is greater than a threshold value 0.5, a smaller dark dot is created. Otherwise a larger light dot is created. When it is determined at step S420 that a larger light dot is to be created, the CPU executes the processing to create a larger light dot at step S440. Otherwise the CPU executes the processing to create a smaller dark dot at step S430. The ratio of the smaller dark dots to the larger light dots can be varied by changing the relationship between the random numbers and the threshold value. A favorable procedure specifies the threshold value by taking into account the ink duty, so as to set a desirable ratio of the smaller dark dots to the larger light dots and cancel the banding. The threshold value may be varied according to the recording sheet of paper.

Figure 25:
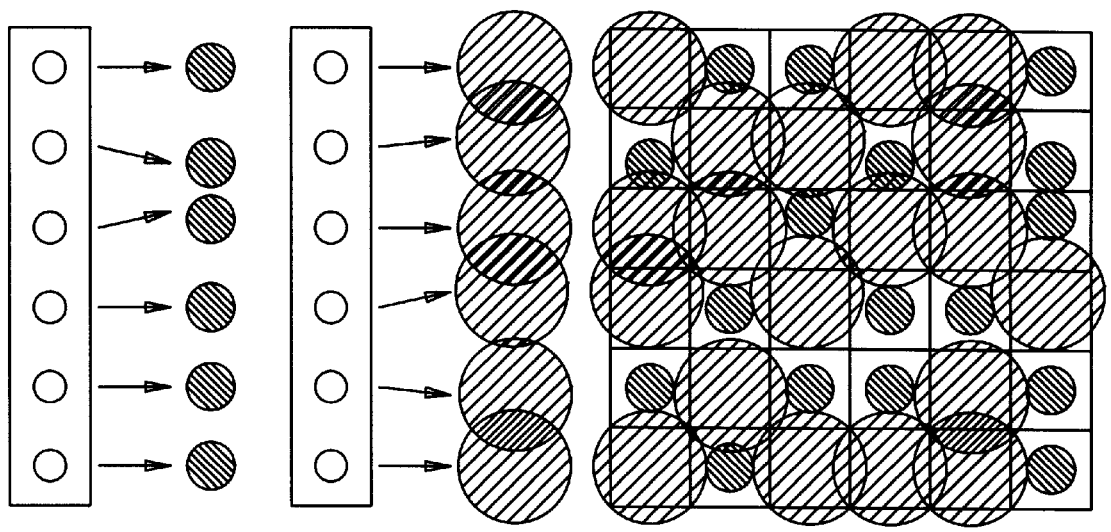
FIG. 25 shows the the state of recording both larger dots and smaller dots according to the random numbers with some unevenness of dot formation.

Like the printing apparatus of the first embodiment, the printing apparatus of the second embodiment can create both the larger dots and the smaller dots and thereby effectively prevent the banding. FIG. 25 shows the dots formed by the printing apparatus of the second embodiment. Comparison between FIGS. 25 and 21 clearly shows that the banding is made significantly inconspicuous in the state of FIG. 25. When the formation of dots has some regularity, unevenness of dot formation is generally conspicuous. The structure of the second embodiment, however, uses the random numbers and has no regularity in formation of dots, thereby making the unevenness of formation of dots significantly inconspicuous.

Figure 26:
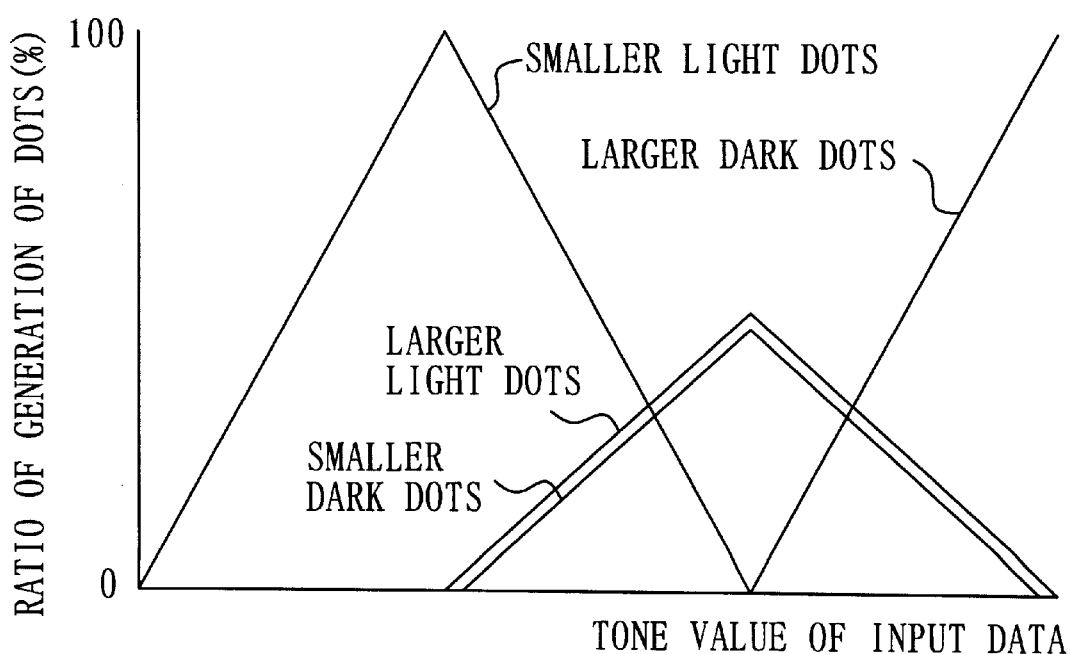
FIG. 26 is a graph showing the ratio of generation of dots plotted against the tone value of image data in the second embodiment.

FIG. 26 is a graph showing the ratio of generation of various types of dots plotted against the tone value of the image data in the second embodiment. The ratio of generation of the dots implies the fraction of each type of dots per predetermined area. For example, when the ratio of generation of smaller light dots is 60%, 60 smaller light dots are recorded per 10×10=100 dots. As shown in FIG. 26, both the larger light dots and the smaller dark dots are used for recording in the half tone. The second embodiment uses the random numbers for allocation of the dots to the smaller dark dot and the larger light dot. This enables the smaller dark dots and the larger light dots to be generated at the approximately 1:1 ratio. This ratio substantially satisfies the limit of the ink duty.

In the printing apparatuses of the first and the second embodiments discussed above, the smaller dark dots and the larger light dots may be allocated according to the quantities of consumption of the higher-density, dark ink and the lower-density, light ink. For example, when the consumption of the dark ink is greater than that of the light ink, the ratio of the larger light dots may be increased in the half tone. The quantity of consumption of each ink may be determined by irradiating the ink cartridge 72 with light or may be calculated from the total number of dots created. The structure of allocating the dots according to the quantities of ink consumption effectively reduces the service cost of the printing apparatus. This structure enables the inks to be consumed substantially equally and has the high cost reducing effect especially in the printing apparatuses of the embodiments where plural colors of inks are stored in one ink cartridge assembly 72 (see FIG. 11).

In the printing apparatuses of the above embodiments, two different ink densities and two different ink weights are adopted to record four different types of dots. The number of available ink densities or ink weights may be increased according to the requirements. In the printing apparatuses discussed above, two different dots are used only in the half tone area. In the case where the number of available ink densities or ink weights is increased, different types of dots may be used in another tone area. This arrangement further enhances the effects of the present invention, that is, the improvement in picture quality (making the banding inconspicuous and meeting the requirement of the ink duty) and the substantially equal consumption of inks.

The printing apparatus discussed above includes the processing executed by the computer. Another application of the present invention is thus a recording medium, on which a program for realizing the respective functions discussed above is recorded. Available examples of the recording media include flexible disks, CD-ROMs, magneto-optic discs, IC cards, ROM cartridges, punched cards, prints on which bar codes and other codes are printed, internal storage devices (memories like RAM and ROM and external storage devices of the computer, and a variety of other computer readable media. The present invention may be constructed as a program supply apparatus that supplies a computer program, which causes the computer to realize the respective steps or functions of the present invention discussed above, via a communication path.

The printer 22 of the embodiments successively outputs the driving waveform for generating smaller dots and the driving waveform for generating larger dots from one waveform generation unit. Another possible structure provides two waveform generation units for the respective driving waveforms and selects one out of the driving waveforms output from the respective waveform generation units, so as to record dots of different ink weights.

The present invention is not restricted to the above embodiments or their applications, but there may be many modifications, changes, and alterations without departing from the scope or spirit of the main characteristics of the present invention. By way of example, although the computer 90 executes the variety of processes discussed above in the first and the second embodiments, the printer 22 may have the functions for executing such processing and executes the processing. The principle of the present invention is also applicable to bubble jet printers that supply electricity to a heater disposed in an ink conduit and thereby cause bubbles in the ink conduit to spout ink. This bubble jet printer can form dots of different ink weights by varying the time of electricity supply to the heater or the area of electricity supply.

What is claimed is:

1. A printing apparatus that records plural types of dots on a printing medium, based on input image data, and thereby prints an image, said printing apparatus comprising:

a head configured to create plural types of dots with respect to at least one hue by combining different ink densities and different ink weights, the dots including smaller dark dots having a first ink density and larger light dots having a second ink density lower than the first ink density such that the smaller and darker dots have a substantially identical unit density or density per unit area and at least one type of different-density dot having a different unit density from the identical-density dots;

a dot specification unit configured to determine according to the input image data for a pixel whether to create a dot with respect to the pixel and which type of a dot among plural types of dots having different unit densities is to be created;

a dot type selection unit configured to select one of the at least two types of identical-density dots based on a predetermined selecting condition with respect to the pixel where one of the identical-density dots is to be created; and a head driving control unit configured to drive said head and to create the dots determined by said dot specification unit and the dots selected by said dot type selection unit in order to print a resulting image.

2. A printing apparatus in accordance with claim 1, wherein the predetermined selecting condition is related to improvement in picture quality of the resulting printed image.

3. A printing apparatus in accordance with claim 2, wherein the condition related to the improvement in picture quality comprises a predetermined ratio of the at least two types of identical-density dots that cancels unevenness of dots created at a specific tone corresponding to the identical-density dots.

4. A printing apparatus in accordance with claim 3, wherein the condition related to the improvement in picture quality further comprises a predetermined arrangement of the at least two types of identical-density dots based on the predetermined ratio.

5. A printing apparatus in accordance with claim 3, wherein the condition related to the improvement in picture quality further comprises a condition for selecting each of the at least two types of identical-density dots at random based on the predetermined ratio.

6. A printing apparatus in accordance with claim 1, wherein said dot type selection unit carries out the selection according to a recording ratio, which is based on an allowable quantity of ink per unit area of the printing medium.

7. A printing apparatus in accordance with claim 1, further comprising:

an ink cartridge assembly configured to store inks having different densities, wherein the predetermined selecting condition is related to quantities of consumption of the inks having different densities.

8. A method of recording plural types of dots on a printing medium with a head, based on input image data, and thereby printing an image, said head configured to create plural types of dots with respect to at least one hue by combining different ink densities and different ink weights, the dots including smaller dark dots having a first ink density and larger light dots having a second ink density lower than the first ink density such that the smaller and darker dots have a substantially identical unit density or density per unit area and at least one type of different-density dot having a different unit density from the identical-density dots, said method comprising the steps of:

(a) determining according to the input image data for a pixel whether to create a dot with respect to the pixel and which type of a dot among plural types of dots having different unit densities is to be created;

(b) selecting one of the at least two types of identical-density dots based on a predetermined selecting condition with respect to the pixel where one of the identical-density dots is to be created; and (c) driving said head and creating the dots determined in said step (a) and the dots selected in said step (b) in order to print a resulting image.

9. A recording medium, on which a program for specifying print data is recorded in a compute readable manner, said print data being used to cause a printing apparatus to record plural types of dots on a printing medium, based on input image data, and thereby to print an image, said program comprising:

a first program code configured to realize a function of determining according to the input image data for a pixel whether to create a dot with respect to the pixel and which type of a dot among plural types of dots is to be created;

a second program code configured to realize a function of selecting one among plural types of identical-density dots having a specific tone level based on a predetermined selecting condition, wherein the dots include smaller dark dots having a first ink density and larger light dots having a second ink density lower than the first ink density such that the smaller and darker dots have a substantially identical unit density or density per unit area and at least one type of different-density dot having a different unit density from the identical-density dots, and a third program code configured to realize a function of outputting a result determined by said determining function and selected by said selecting function.

* * * * *